(12) United States Patent
Aas et al.

(10) Patent No.: US 7,990,108 B2
(45) Date of Patent: Aug. 2, 2011

(54) CHARGE DETECTOR

(75) Inventors: Arne Aas, Trondheim (NO); Gunnar Gastoe, Trondheim (NO)

(73) Assignee: Atmel Corporation, San Jose, CA (US)

( * ) Notice: Subject to any disclaimer, the term of this patent is extended or adjusted under 35 U.S.C. 154(b) by 1009 days.

(21) Appl. No.: 11/748,278

(22) Filed: May 14, 2007

(65) Prior Publication Data

US 2008/0284383 A1 Nov. 20, 2008

(51) Int. Cl.
*H02J 7/00* (2006.01)
*H02J 7/04* (2006.01)
*G01N 27/416* (2006.01)

(52) U.S. Cl. ........ 320/134; 320/112; 320/126; 320/136; 320/162; 320/164; 324/433

(58) Field of Classification Search .................. 320/162, 320/134
See application file for complete search history.

(56) References Cited

U.S. PATENT DOCUMENTS

| | | | |
|---|---|---|---|
| 3,566,143 A | 2/1971 | Paine et al. | |
| 4,695,784 A * | 9/1987 | Reynolds | ...................... 320/143 |
| 5,166,594 A | 11/1992 | Schramm et al. | |
| 5,982,144 A | 11/1999 | Johnson et al. | |
| 6,297,619 B1 | 10/2001 | Terada | |
| 6,331,764 B1 | 12/2001 | Oglesbee et al. | |
| 6,340,880 B1 * | 1/2002 | Higashijima et al. | ......... 320/162 |
| 6,653,820 B1 | 11/2003 | Smith | |
| 6,700,766 B2 * | 3/2004 | Sato | ............................. 361/93.1 |
| 7,626,360 B2 * | 12/2009 | Melanson | ..................... 320/134 |
| 2005/0134229 A1 | 6/2005 | McClure | |
| 2006/0082345 A1 | 4/2006 | Daniel-Ivad et al. | |

FOREIGN PATENT DOCUMENTS

WO   WO 99/39421   8/1999

OTHER PUBLICATIONS

"Battery Charger and Overcharge Protection Circuit", by AE Paniccia, *IBM Technical Disclosure Bulletin*, p. 416, Jul. 1970.
"Battery Protection IC for 1-Cell Pack", S-82IIC Series, Seiko Instruments Inc., Rev. 4.5_oo, pp. 1-39, undated.

* cited by examiner

*Primary Examiner* — Edward Tso
*Assistant Examiner* — Johali A Torres Ruiz
(74) *Attorney, Agent, or Firm* — Fish & Richardson P.C.

(57) ABSTRACT

The subject matter of this specification can be embodied in, among other things, an apparatus that includes a battery system, which includes at least one cell and a charge enable device to couple the at least one cell to a charging voltage. The apparatus also includes an excessive voltage detector to output a signal to control the charge enable device. The signal prevents charging of the at least one cell if an excessive charging voltage is detected based on an activation of a clamping component.

31 Claims, 10 Drawing Sheets

CHARGE DETECTOR

TECHNICAL FIELD

The present invention relates to electrical circuits.

BACKGROUND

Many modern portable devices (e.g., laptop computers, mobile phones, digital cameras, video cameras, media players, personal digital assistants (PDAs), game console, etc.) include battery packs. One particular type of conventional battery pack includes one or more battery cells coupled to one or more Integrated Circuit (IC) chips. The chips typically include a controller (e.g., a microcontroller) and circuitry and provide, among other things, battery cell management and protection.

Some conventional battery packs include a Li-ion (Lithium ion) battery cell, which is essentially a volatile chemical reaction packaged inside a cylinder. Potential energy is stored in each cell, and if the battery cell is exposed to conditions outside of its specification the cell can over heat, catch fire or explode. Conventional battery packs configured with these volatile cells typically include fail-safe circuitry for detecting unsafe conditions (e.g., charge or discharge over-currents, short circuits, etc.), and for taking corrective action to prevent damage to the battery cell and/or device, and to protect the end user.

In some conventional battery packs, two external transistors (e.g., field effect transistor (FETs)) are connected in series with the battery cell(s) and are enabled and disabled to allow for the charge and discharge of the cells. The transistors allow the cell(s) to be disconnected from either the charger or a device based on one or more monitored conditions to avoid improper or dangerous operation. The disabling of the FETs can be triggered by certain events, such as short-circuit, too deep of a discharge, or incorrect battery charging as a result of the detection of too high of currents for too long a time period, too high or too low battery cell voltages or too high temperatures. The enabling of the FETs is also triggered by certain other events, when it is considered that potentially dangerous conditions are not present or have been resolved.

In one configuration, referred to as a high-side solution, the two transistors are coupled in series between the positive terminal of the cell(s) and a positive battery pack terminal (e.g., the external positive terminal interface to a device). In a low-side solution, the two transistors are coupled in series between the negative terminal of the cell(s) and a negative battery pack terminal (e.g., the external negative terminal interface to a device).

SUMMARY

In general, this specification describes electrical circuits for detecting charge.

In a first general aspect, an apparatus is described. The apparatus includes a battery system that includes at least one cell and a charge enable device to couple the at least one cell to a charging voltage. The apparatus also includes an excessive voltage detector to output a signal to control the charge enable device. The signal prevents charging of the at least one cell if an excessive charging voltage is detected based on an activation of a clamping component.

In a second general aspect, an apparatus is described that includes a battery system, which includes at least one cell and a charge enable device to couple the at least one cell to a charging voltage. The apparatus also includes means for outputting a signal to control the charge enable device. The signal prevents charging of the at least one cell if an excessive charging voltage is detected based on an activation of a clamping component. In another general aspect, an apparatus is describes that includes a charge enable device that couples a charging voltage to at least one battery cell, a clamping component used to detect whether the charging voltage is excessive, and a switch that passes a signal to disable the charge enable device when the clamping component detects an excessive charging voltage.

In yet another general aspect, an apparatus is described, which includes a charge enable device that couples a charging voltage to at least one battery cell. The apparatus also includes a voltage detector, which includes a clamping component to output a signal to control the charge enable device. The signal prevents charging of the at least one battery cell if an excessive charging voltage is detected based on an activation of the clamping component.

In another general aspect, a method is described. The method includes determining, based on an activation of a first clamping component, whether excessive voltage is coupled to a battery system, which includes at least one cell and a charge enable device used to control charging of the at least one cell. The method also includes outputting a signal to the charge enable device to disable charging of the at least one cell if excessive voltage is present.

In another general aspect, a method is described that includes coupling a charging voltage to a battery cell through a charge enable device, detecting an excessive charging voltage based on activation of a clamping component, and enabling a switching transistor to couple a control of the charge enable device to a voltage sufficient to substantially restrict current through the charge enable device.

In certain implementations, the systems and methods described here may provide none, one, or more of the following advantages. Rapid protection from excessive charging voltages can be achieved using circuitry closely integrated with a charge pump. An excessive voltage detector may completely disable charging of a battery faster than traditional current and voltage supervisor circuits. Excessive voltage detection can be implemented using low-cost hardware which can react more quickly than software, which may require multiple A/D conversions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Reference will be made to a one-chip battery management system where a gate driver, a microcontroller, non-volatile memory, and other circuit components are integrated in single integrated circuit. Alternatively, the proposed methods and systems can be realized in a multi-chip solution. The methods and systems disclosed can be implemented in these and other architectures as would be understood by those of ordinary skill in the art. A method, apparatus and system are described for enabling and disabling charge and discharge transistors in a battery pack in a manner which ensures the complete enabling or disabling of the components in response to battery management system monitor circuitry.

Battery operated devices, such as cell phones, personal digital assistants (PDAs), and laptop computers, can include rechargeable batteries. A rechargeable battery can include multiple battery cells, where a cell can generate electrical energy from chemical energy. The battery cells as well as control and management circuitry can be included in a battery pack.

Battery operated devices can allow a user to operate the device without having to plug it into a power outlet. The device can be used in areas that do not have conveniently located power outlets or perhaps any power outlets at all. The use of rechargeable batteries may require the user, for example, to periodically recharge the device's internal batteries with the use of a separate battery charger.

It is not uncommon that devices with rechargeable batteries may require a specific battery charger to recharge the internal batteries due to the voltage and/or current capabilities of the batteries. It is also not uncommon that many battery chargers may appear similar, and include similar, if not identical, connectors for charging batteries. This may result in a user inadvertently using the wrong battery charger for a particular device. The device's batteries may be damaged or destroyed by this error. In some cases, this damage may render the batteries unusable, requiring replacement.

A proposed battery management system monitor circuitry can include a detector that senses when a battery charger with an excessive voltage (a rogue battery charger) is connected to a battery. The circuitry may provide rapid protection from the excessive voltage, which prevents the batteries from incurring damage. In some implementations, the circuitry is used in conjunction with existing battery management systems to monitor circuitry and provide rapid supplemental protection due to the speed at which it can detect excessive voltage.

Battery Pack including Battery Management System

Figure 1A:
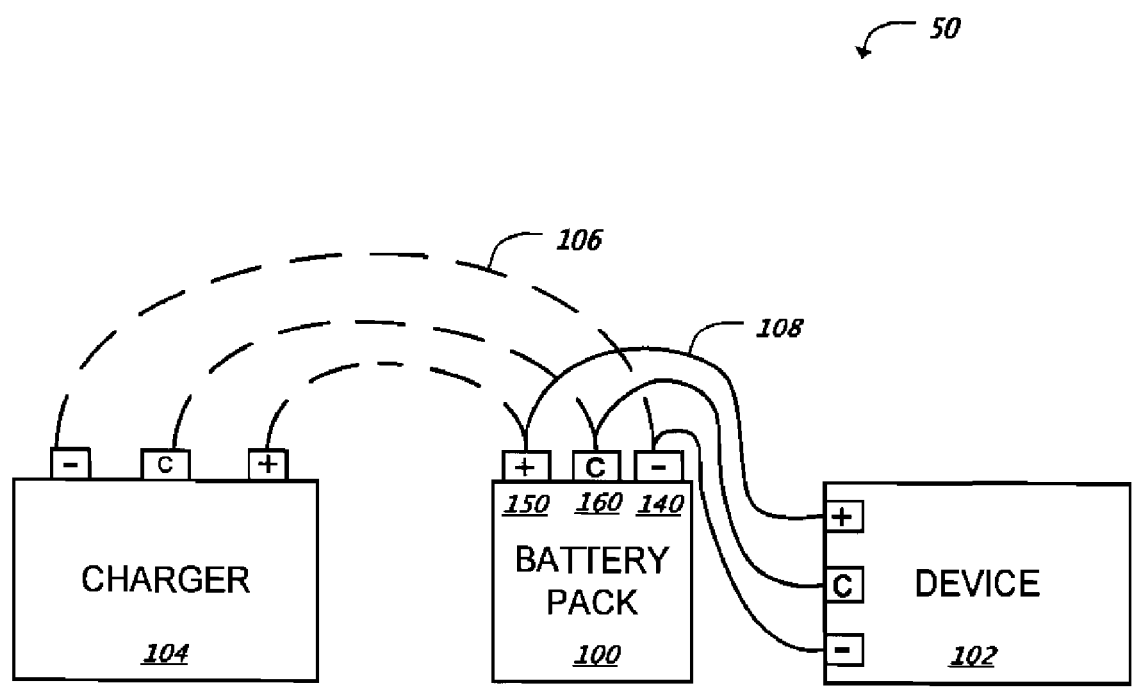
FIG. 1A is a schematic diagram of an exemplary application including a battery pack.

FIG. 1A is a schematic diagram of an exemplary application 50 including a battery pack 100. Battery pack 100 can be coupled to either a device 102 or a charger 104. When coupled to the charger 104, terminals (i.e., positive 150, negative 140, and optionally communication 160 terminals) of the battery pack 100 are coupled by a medium 106 to corresponding terminals (i.e., positive, negative, and communication terminals) of the charger 104 to allow for the charging of cell(s) associated with the battery pack 100. Medium 106 can be of the form of wires, leads, pins, or other means of electrical connection. Charging is discussed in greater detail below.

Similarly, when coupled to a device 102, terminals (i.e., positive 150, negative 140, and communication 160 terminals) of the battery pack 100 are coupled by a medium 108 to corresponding terminals (i.e., positive and negative) of the device 102 to allow for the operation of the device 102. Medium 108 can be of the form of wires, leads, pins, or other means of electrical connection. In some implementations, battery pack 100 is also coupled to device 102 or charger 104 at respective communication ports. Communication ports allow for the transfer of information (e.g., command and control) between the device 102, charger 104 and battery pack 100. One example of information that can be exchanged includes the battery charge level (i.e., capacity). Another example of information that can be exchanged includes the voltage, current and power rating of the battery pack 100.

Figure 1B:
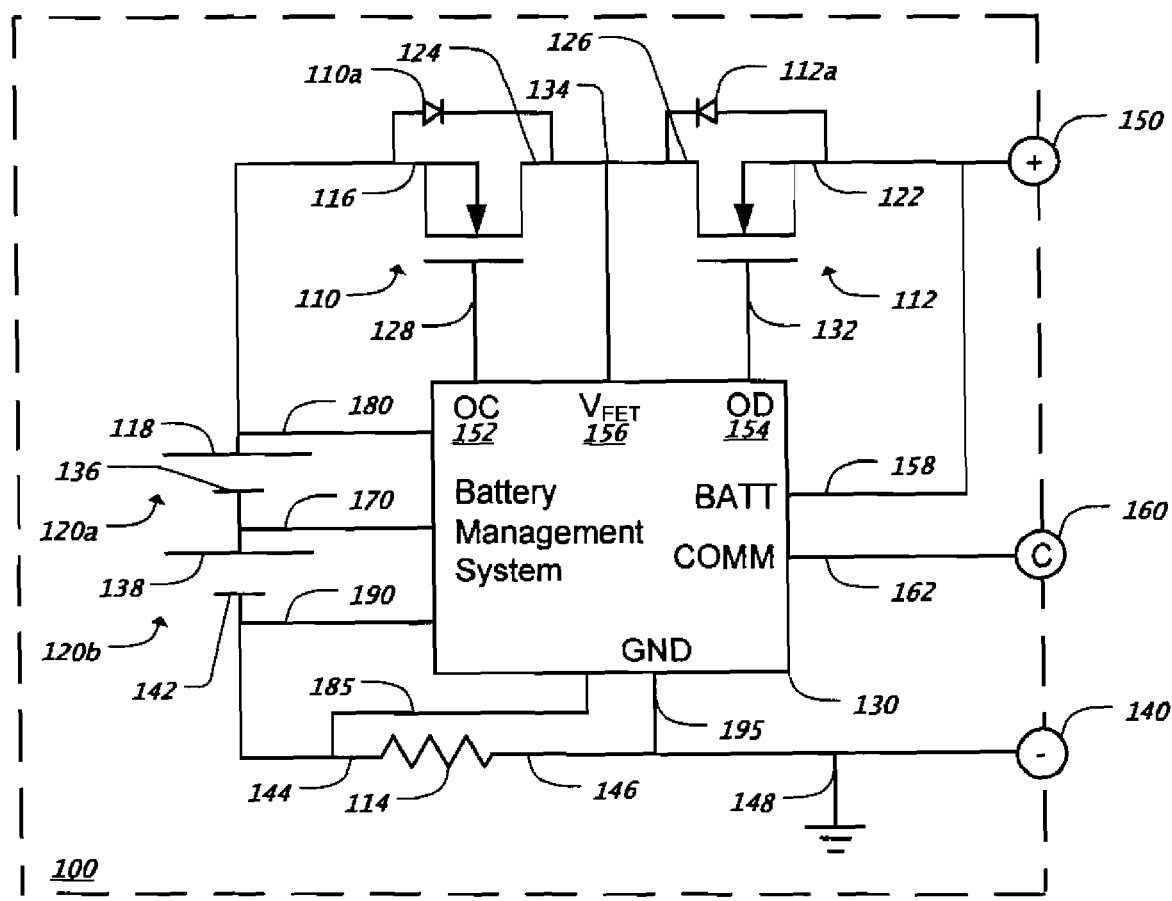
FIG. 1B is a schematic diagram of an exemplary battery pack.

FIG. 1B is a schematic diagram of the exemplary battery pack 100 in FIG. 1A. Battery pack 100 can include one or more battery cells 120 (e.g., 120a, 120b), discrete transistors 110, 112, a shunt resistance 114, and battery management system 130.

Discrete transistors 110, 112 can be used to disconnect the battery cells 120 from the external battery pack terminals (external battery pack positive terminal 150 and negative terminal 140). External battery pack positive terminal 150 is also coupled to battery management system 103 at BATT 158. In the implementation shown, two discrete transistors are shown which can be of the form of Field Effect Transistors (FETs). While other transistor technologies can be used, FETs present advantages in terms of process, performance (e.g., on-resistance), cost, size, etc. In the implementation shown, two transistors are provided and represent separate charge 110 and discharge 112 transistors. Charge transistor 110 can be used to enable safe charging of the battery cells 120. Discharge transistor 112 can be used to enable safe discharging of the battery cells 120.

In the implementation shown, the charge and discharge transistors 110,112 are coupled in series. In one implementation, two n-type channel FETs (NFETs) are used and are coupled drain-drain (124, 126 respectively) in a series configuration. By applying a voltage that is substantially equal to the source voltage (or a voltage that generates a $V_{GS}$ that is below the transistor threshold voltage $V_{TH}$) to gate 128 of the charge transistor 110 (e.g., an NFET), for example, the current flow from source 116 to drain 124 can be impeded, in effect switching the transistor off. For example, the charge transistor 110 can be disabled (e.g., turned "off") by applying a ground 148 to the gate 128. Alternatively, two p-type channel FETs (PFETs) could be used and be coupled source-source. By applying a voltage to the gate of a PFET, for example, where the gate voltage is equal to the source voltage, the transistor can be disabled (e.g., turned "off"). In a PFET solution additional diodes (not shown) may be required to enable power to the battery management system 130 (i.e., to feed $V_{FET}$ 156).

In the implementation shown, the charge and discharge transistors 110,112 are coupled in a high-side configuration (i.e., the series transistors are coupled to the high side of the battery cells as opposed to a low-side configuration where the transistors would be coupled to the low-side of the battery cells). In the high-side configuration shown, terminal 116 of the charge transistor 110 (a source in a NFET implementation) is coupled to positive terminal 118 of the battery cell 120a. Terminal 122 of discharge transistor 112 (also a source in a NFET implementation) is coupled to the external battery pack positive terminal 150. Respective second terminals 124, 126 of the charge and discharge transistors 110, 112 are coupled to each other (forming a drain-drain junction in a NFET implementation). Respective gates 128 and 132 of charge transistor 110 and discharge transistor 112 are coupled to battery management system 130 at inputs 152 and 154, OC and OD, respectively. Similarly, junction 134 between the transistors 110, 112 is coupled to the battery management system 130 at a battery management system input (or sometimes referred to herein and labeled in FIG. 1B as $V_{FET}$ 156). The battery management system input provides operational power to the battery management system 130.

In the implementation shown, two transistors are used in order to block the current flow in both directions. More specifically, FETs (e.g., transistors 110, 112) include a parasitic diode (110a and 112a, respectively). Therefore, having a single FET would not allow for the disabling of current flow in both directions. When two FETs are used in series (either source to source, or drain to drain), current flow into and out of the battery cells can be disabled. Similarly, when two transistors are used, selective control can be exercised to allow current flow in only a single direction at a given time (i.e., charge is allowed, but discharge is not until sufficient charge has been placed into the battery cells).

Battery cells 120 are rechargeable batteries and can be of the form of lithium ion (Li-ion) or lithium polymer (Li-polymer). Other battery technology types are possible. Where plural cells are provided, the battery cells 120a, 120b are coupled in series. In the two-cell implementation shown, a top-most positive terminal 118 of battery cell 120a is coupled to the battery management system 130 at input 180 (e.g., to allow for the detection of the battery voltage level) and to one of the discrete transistors (i.e., the charge transistor 110). Negative terminal 136 of the top most battery cell 120a and positive terminal 138 of the bottom most battery cell 120b are coupled together and to the battery management system 130 at input 170. Negative terminal 142 of the bottom most battery cell 120b in the series is coupled to the battery management system 130 at input 190 (e.g., to allow for the detection of the battery voltage level) and to terminal 144 of the shunt resistance 114. Though a two battery cell implementation is shown, other number of battery cells can be included in battery pack 100, including a single battery cell and other multiple cell configurations.

Terminal 144 of shunt resistance 114 is also coupled to the battery management system 130 at input 185. Terminal 146 of shunt resistance 114 is coupled to a local ground 148, which is the ground for the battery pack 100. Terminal 146 is also coupled to the battery management system 130 at input GND 195 and to the external battery pack negative terminal 140 of the battery pack 100. The battery management system 130 can measure the current flow through the shunt resistance 114. This measurement can be used to determine the current flow through battery cells 120a, 120b.

The battery management system 130 can include supervisor electronics to protect the battery pack in case of incorrect operation, and monitoring electronics to estimate remaining battery capacity. Electronics are also included that can detect if a rogue battery charger is connected to the battery pack 100. The battery management system can also include a controller (e.g., a micro-controller) for system control and memory (e.g., EEPROM, Flash ROM, EPROM, RAM, etc.). The system 130 is also capable of communicating with the device 102 and/or the charger 104 coupled to the battery pack 100.

As discussed above, certain battery technologies can create undesirable or dangerous conditions if improperly used. For example, Li-ion and Li-polymer batteries can overheat, explode or self-ignite if they are overcharged or discharged too rapidly. Further, Li-ion and Li-polymer batteries can lose a significant amount of their charge capacity if they are too deeply discharged. Battery management system 130 includes supervisory electronics to ensure fault free operation, at least one of which is complete enabling and disabling of the charge transistor 110 so as to ensure improper charge does not occur. Further, complete enabling of the charge transistor 110 is provided to enable rapid charging of the battery cell(s). Similarly, the battery management system 130 includes supervisory electronics to provide complete enabling and disabling of the discharge transistor 112 so as to ensure proper discharge characteristics when coupled to a device. The enabling and disabling of charge and discharge transistors are discussed in greater detail below.

Monitoring electronics that are part of battery management system 130 can be used to estimate remaining battery capacity. Battery capacity information can be communicated between the battery management system 130 and a connected device/charger through a communications port terminal 160, which is coupled to the battery management system 130 at COMM 162. As will be discussed in greater detail below, a microcontroller (and associated memory) can be included within battery management system 130 and can provide system control and communication with a connected device.

Battery Management System

Figure 2:
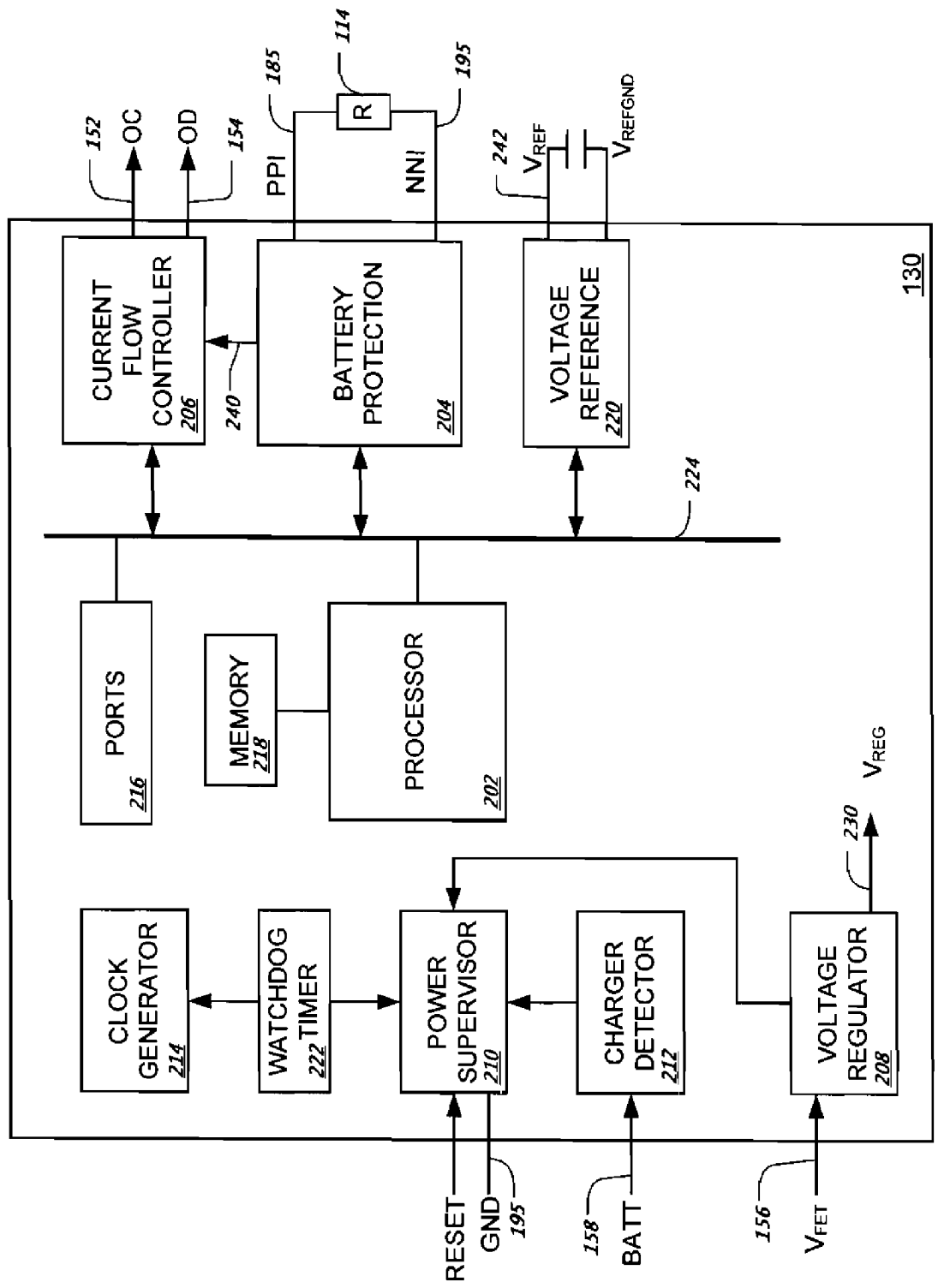
FIG. 2 is a block diagram of an exemplary battery management system.

FIG. 2 is a block diagram of an exemplary battery management system 130 used in the battery pack 100 of FIG. 1B. The battery management system 130 includes a processor 202 (e.g., a low-power, CMOS 8-bit microcontroller based on a RISC architecture), a battery protection circuit 204, a current flow controller 206, voltage regulator 208, power supervisor 210, charge detector 212, clock generator 214, ports 216, memory 218, voltage reference 220, and watchdog timer 222. The processor 202, ports 216, battery protection circuit 204, current flow controller 206, and voltage reference 220 are each coupled to a data bus 224.

Certain implementations of the battery management system 130 can include other components and subsystems, which are not included in FIG. 2 for clarity purposes. For example, the battery management system 130 can include circuitry for battery monitoring (e.g., analog-to-digital converters), cell balancing circuitry (e.g., cell balancing FETs) for balancing cell voltages, a communications device for communicating with an external device, noise suppression circuitry, wake-up timer, and other monitor or control circuitry.

Battery management system 130 includes plural components, as discussed below with reference to FIG. 2, which can be integrated in a single package (e.g., integrated in a single integrated circuit). Alternatively, battery management system 130 components can be packaged separately. For example, system 130 can be implemented as two integrated circuits (e.g., the system can include a separate analog front-end and a separate non-volatile memory).

The memory 218 can be programmed with instructions that can be executed by the processor 202 to perform various tasks, such as cell balancing, battery protection, and current measurements for determining charge level.

In some implementations, the current flow controller 206 has several outputs (e.g., OC 152, OD 154), which are coupled to external devices that can be configured by the current flow controller 206 to control the current flow between the battery cells and a device or charger. The current flow controller 206 includes various circuits and logic (e.g., operational amplifiers, control and status registers, transistors, capacitors, diodes, inverters, gates, etc.) for generating voltages at the outputs (e.g., OC 152 and OD 154). In some implementations, the OC 152 output is a high voltage output that can be coupled to the gate of a charge FET (e.g., charge transistor 110) to completely or partially enable or disable the charge FET to control current flow during a charging event. The OD 154 output is a high voltage output that can be coupled to the gate of a discharge FET (e.g., discharge transistor 112) to completely or partially enable or disable the discharge FET to control current flow during a discharging event. FIG. 1B shows an exemplary configuration of FET devices in a high-side implementation for controlling current flow in response to control voltages from the current flow controller 206.

In alternate implementations, the current flow controller 206 can include circuitry to detect the use of a rogue battery charger that is connected to the battery pack 100. In some implementations, the OC output 152 of the battery management system 130 is a high voltage output. The detection circuitry can control the coupling of the OC output 152 to the gate of a charge FET to completely or partially enable or disable the charge FET to control current flow during a charging event. For example, if the detection circuitry detects a rogue battery charger, it can disable charge transistor 110 which stops the current flow to the battery cells 120a, 120b protecting them from an excessive charging or other damage.

The current flow controller 206 is coupled to the battery protection circuit 204 through interface 240. The battery protection circuitry 204 includes circuitry (e.g., a differential amplifier) for monitoring the battery cell voltage and charge/discharge currents to detect fault conditions, and to initiate actions (e.g., enabling and/or disabling charge and discharge FETs) to protect the battery pack 100 from being damaged. Examples of fault conditions include but are not limited to: deep under-voltage during discharging, over-voltage during charging, short-circuit during discharging, and over-current during charging and discharging. In some implementations, a current sense resistance (e.g., shunt resistance 114) can be coupled across inputs PPI (e.g., input 185) and NNI (e.g., input GND 195) of the battery protection circuit 204, where PPI is an unfiltered positive input from the current sense resistance and NNI is an unfiltered negative input from the current sense resistance. The current sense resistance can be coupled to the battery cells and battery management system 130, as described with respect to FIG. 1B.

Gate Driver Circuit Including Rogue Charge Detector

Figure 3:
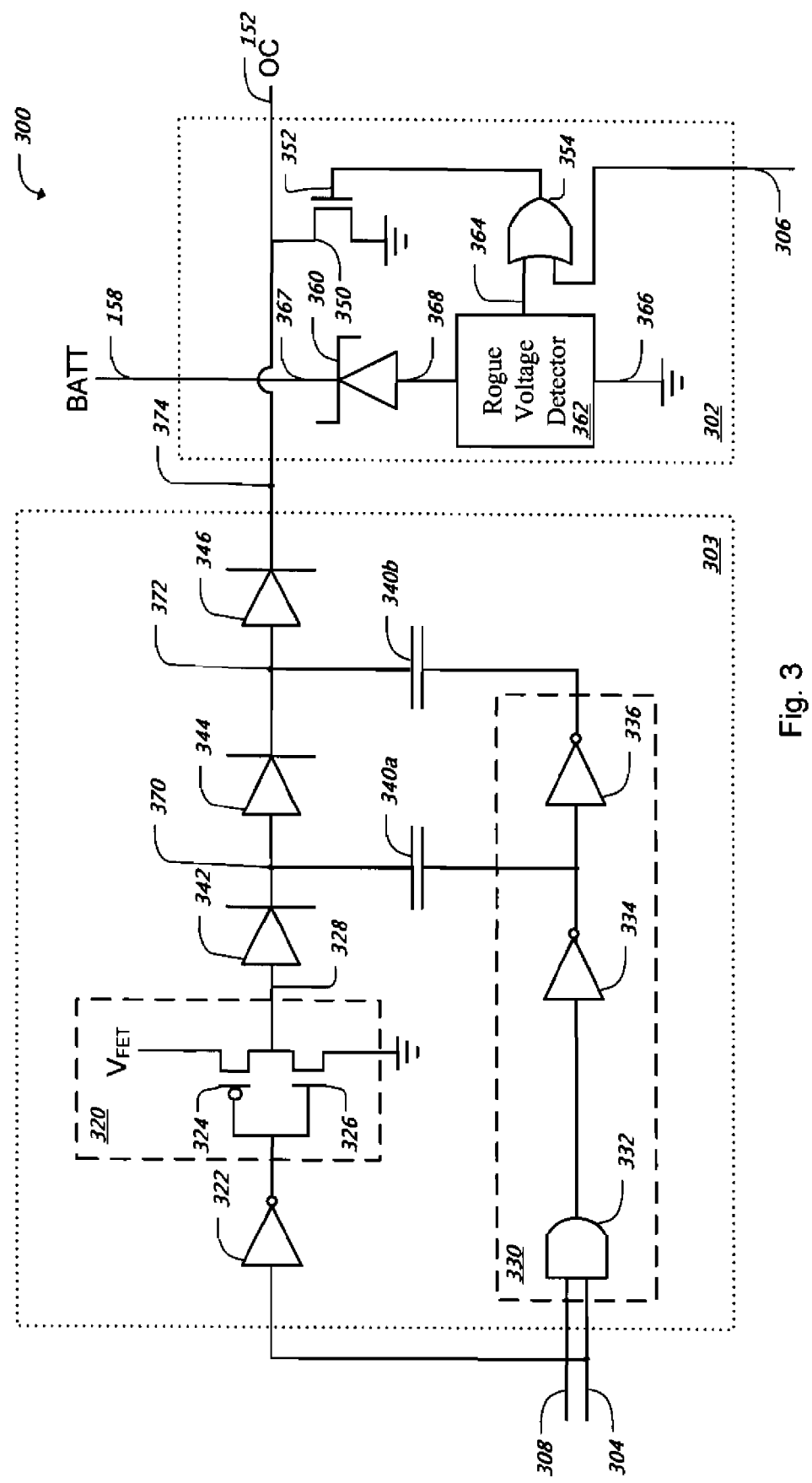
FIG. 3 is a block diagram of an exemplary drive circuit, which includes a rogue charge detector, associated with a charge transistor in the battery pack of FIG. 1B.

FIG. 3 is a block diagram of an exemplary gate drive circuit 300 associated with the charge transistor 110 in the high-voltage front end of the battery pack 100 as shown in FIG. 1B. Drive circuit 300 can be included in the current flow controller 206 of FIG. 2 and includes gate driver 302 and charge pump 303.

Gate driver 302 can provide a drive signal (e.g., OC 152) to the input gate of the charge transistor 110. Another instance of the gate driver 302 may provide a drive signal (e.g., OD 154) to the input gate of the discharge transistor 112. The drive signal (e.g., OC 152) provided by the gate driver 302 can be low (e.g., a signal substantially equal to local ground 148 is output), and in other situations, the drive signal provided by the gate driver 302 is high (e.g., a signal substantially equal to the operating supply voltage, $V_{FET}$ 156, plus a constant ("boost") is output). In some implementations, the constant is a potential that is sized to ensure complete enabling (e.g., turning "on") of the charge transistor 110. For example, by providing the additional boost generated by the charge pump 303 to the gate 128 of charge transistor 110, gate driver 302 can be ensured of completely enabling the charge transistor 110. Charge transistor 110 can connect the positive battery terminal 150 to the battery cells 120a, 120b. This can allow for rapid charging of the battery cells 120a, 120b when the charger 104 is connected to the battery pack 100.

The gate driver 302 is in operable connection to the charge pump 303. Charge pump 303 can provide a high signal to the gate driver 302 which, in turn, can provide the high signal to gate 128 of charge transistor 110. The charge pump 303 can be controlled by clock signal 308 and signal 304. The control of the charge pump 303 is described in greater detail below.

When turned on (e.g., a positive bias is applied to gate 352) transistor 350, included in gate driver 302, can provide a low signal to the gate 128 of charge transistor 110. The transistor 350 can be controlled by signal 306, and by the output 364 of detector 362, which will be described in greater detail below.

Instances of the gate driver 302 can provide an output signal (e.g., OC 152) that can drive the charge transistor 110 and the discharge transistor 112.

Charge Pump

In some implementations, charge pump 303 can include a drive signal source 320, boost logic 330, signal boosters 340a, 340b, and a plurality of blocking diodes 342, 344, 346.

Drive signal source 320 provides an initial level drive signal, which is pumped up by the operation of charge pump 303. In the implementation shown, drive signal source 320 is of the form of a level shifter that includes complementary transistors 324, 326. As shown, complementary transistors 324 and 326 have gates that are complementarily, that is, only one is enabled at a given time. An inverter 322 provides the gate inputs to complementary transistors 324, 326. The input to inverter 322 is provided by signal 304. Accordingly, as the signal 304 is driven high, the input to inverter 322 is driven high. Thereafter, the output of inverter 322 is driven low and is presented to the gate inputs of complementary transistors 324, 326. The high-side transistor 324, with its low input, is enabled (turned on) by the low signal presented by inverter 322 resulting in the battery management system supply potential (i.e., $V_{FET}$ 156) being presented to output 328 of the drive signal source 320. Alternatively, if the signal 304 is driven low (e.g., the input to inverter 322 is low), the output of inverter 322 is driven high and is presented to the gate inputs of complementary transistors 324, 326. In this condition, the low-side transistor 326, with its high input, is enabled (turned on) by the high signal presented by inverter 322 resulting in the battery management system ground potential (e.g., local ground 148) being presented to output 328 of the drive signal source 320. In this way, the drive signal source 320 is configured to provide either substantially a ground or substantially an operating potential signal to the remainder of the charge pump circuitry in accordance with the signal 304. Also, logic circuitry (not shown) can be provided to insure that signal 306 will be the inverted value of signal 304 (they cannot be the same value).

The output 328 of drive signal source 320 is provided to an input of blocking diode 342. Blocking diode 342 allows the output 328 of the drive signal source 320 to propagate toward the output of charge pump 303, while blocking any return signal. The output of blocking diode 342 is coupled to the input of a second blocking diode 344.

Boost logic 330 is provided to selectively control the addition of a boost signal to the drive signal provided by the drive signal source 320. In the implementation shown, boost logic 330 includes AND gate 332, and inverters 334, 336. One input to AND gate 332 is signal 304. A second input to AND gate 332 is clock signal 308. In some implementations, clock signal 308 is a fast clock signal that allows the charge pump 302 to quickly achieve the correct potential level (e.g., 3.6 MHz). Alternatively, a slow clock signal that consumes less power can be used (e.g., 131 kHz). In other implementations, charge pump 303 can be provided with one of either a fast or slow clock signal at the clock signal input 308 depending on a mode of operation of the battery management system 130. For example, if the battery management system 130 is in a low power or sleep mode, the slow clock signal can be provided to the charge pump 303. Alternatively, if the battery management system 130 is not in a low power mode, a fast clock signal can be provided to the clock signal input 308. In another implementation, a fast clock signal can be provided for a predetermined period of time (i.e., initially) to the charge pump 303 even when in the low power mode. Doing so ensures that the FET driver (i.e., gate driver 302) reaches the correct charge levels quickly even in low power modes.

The output of AND gate 332 is provided to the input of inverter 334. The output of inverter 334 is provided to the input of inverter 336 and to the input of signal booster 340a. The output of inverter 336 is provided to the input of signal booster 340b. In another implementation, a regulated voltage that is provided by the voltage regulator 208 included in the battery management system 130 powers each of the boost logic gates, gates 332, 334, and 336. Voltage regulator 208 of the battery management system 130, as shown in FIG. 2, can provide the regulated voltage ($V_{REG}$ 230). The voltage regulator 208 may be implemented, for example, using a step-up regulator, a step-down regulator, a linear regulator, etc. Additionally, the voltage regulator 208 can be implemented using a combination of regulators.

Signal boosters 340a, 340b can be capacitive elements. In some implementations, each signal booster 340a, 340b can be a capacitor sized substantially to be 10 picofarads. The output of signal booster 340a is coupled to the input of second blocking diode 344. The output of the second blocking diode 344 is coupled to the input of a third blocking diode 346. First blocking diode 342 prevents the output of the first signal booster 340a from being returned into the drive signal source 320. The output of signal booster 340b is coupled to the input of the third blocking diode 346. Second blocking diode 344 prevents the output of signal booster 340b from being returned into the drive signal source 320 (as well as into signal booster 340a). Third blocking diode 346 can allow for boosting the output signal 374 when the signal booster 340b is driven high.

The output of third blocking diode 346 is coupled to the input of the gate driver 302, which generates output signal OC 152. Typically, the output signal OC 152 is coupled to a large capacitive load. Diode 346 can also prevent the resulting high signal level on the capacitive load coupled to the output signal OC 152 from being returned to the signal booster 340b when the signal booster 340b is driven low.

Clamp, Detector, and Disable Switch

In some implementations, charge pump 303 includes a clamp 360. Clamp 360 can protect the internal circuitry of the battery management system 130, which can ensure that charging can be disabled in the presence of a high charger voltage. In the implementation shown, clamp 360 is a Zener diode coupled between BATT 158 and the input to detector 362. The clamp 360 can be sized and rated appropriately to clamp when the voltage at its cathode 367 exceeds a predetermined maximum rated voltage. The voltage at the cathode, for example, can be provided by the charger 104 or battery cells 120a, 120b.

The battery charger 104 can also provide a voltage, $V_{FET}$ 156. The battery charger will drive the positive terminal 150 of FIG. 1B. If the $C_{FET}$ is enabled, substantially the same voltage will appear at $V_{FET}$.

In some implementations, clamp 360 is a Zener diode coupled between $V_{FET}$ 156 and the input to detector 362. In this case, the voltage level at $V_{FET}$ 156 can be used to determine when the clamp 360 will conduct, and when the detector 362 will enable transistor 350, disabling charging of the battery cells 120a, 120b by charger 104.

The charge pump 303 adds a constant voltage to $V_{FET}$ 156 received from the battery charger 104 to generate OC 152. In some implementations, clamp 360 is a Zener diode coupled between OC 152 and the input to detector 362. If $V_{FET}$ 156 increases, the OC 152 voltage will increase, and at some point, $V_{FET}$ 156 will have increased sufficiently to make the OC 152 voltage higher than the clamp's threshold. In this case, the voltage level at OC 152, Voc, can be used to determine when the clamp 360 will conduct, and when the detector 362 will enable transistor 350, disabling charging of the battery cells 120a, 120b by charger 104. The predetermined maximum rated voltage of the clamp 360 can be a voltage value that, if exceeded, could cause potential damage to the battery.

Transistor 350 is coupled to the output of the gate driver 302 (OC 152). Gate 352 of transistor 350 is controlled by OR gate 354, which is controlled by signal 306, and the output 364 of detector 362. In other implementations, the OR gate 354 is not included and the output of the rogue voltage detector 362 can be directly coupled to the gate 352 of the transistor 350. In the implementation shown, transistor 350 is a transistor that is coupled between the output 374 of the charge pump 303 and local ground 148.

In the implementation illustrated by FIG. 3, when either signal 306, the output 364 of detector 362, or both, are high, the gate 352 of transistor 350 is also high, and transistor 350 is turned on. A direct signal path to local ground 148 is then provided at OC 152. This, in turn, can provide a low to gate 128 of the charge transistor 110 completely disabling the gate of the NFET charge transistor and turning charge transistor 110 off. The positive battery terminal 150 is then disconnected from the battery cells 120a, 120b, which stops charging of the battery cells by the charger 104, when charger 104 is connected to battery pack 100.

In other implementations, when both signal 306 and the output 364 of detector 362 are low, the gate 352 of transistor 350 is also low, and transistor 350 is turned off. When the transistor 350 is turned off, the charge pump 303 can provide (through the output 374) the signal OC 152 that turns on the charge transistor 110, which enables charging of the battery cells 120a, 120b by the charger 104.

In the implementation of FIG. 3, signal 304 and signal 306 are complementary (e.g., when signal 304 is low, signal 306 is high and vice versa). Therefore, either the transistor 350 or the charge pump 303 can provide the output signal OC 152 (e.g., the transistor 350 provides a ground for OC 152 and the charge pump 303 provides a signal plus a boost for the OC 152). If the transistor 350 provides the OC 152, battery charging is prevented, and if the charge pump 303 provides the OC 152, battery charging is permitted.

In an alternate implementation, signal 304 and signal 306 may not be complementary. Both signal 304 and signal 306 can be low. In this case, the transistor 350 generates a low signal OC 152. The low level can be maintained by the addition of an external resistor, for example, connected between the source of the transistor 350 and ground.

In the implementation of FIG. 3, detector 362 includes circuitry that is coupled to the anode 368 of clamp 360 and to an input to OR gate 354. The detector 362 can detect whether or not the clamp 360 is activated (e.g., the diode's breakdown voltage has been met), and can provide the appropriate control signal (e.g., output 364) to the OR gate 354. OR gate 354 then provides the appropriate control signal based on the output 354 of detector 362 and the signal 306 to the gate 352 of transistor 350.

For example, the detector 362 can include circuitry that detects the presence of excessive charge voltage. This can occur when a rogue charger (an inappropriate or non-compatible charger) is connected to the battery pack 100. In this case, clamp 360 will activate and the output 364 of detector 362 will be high. The output of OR gate 354 will also be high, and will turn on transistor 350 which will turn off the charge transistor 110. Charger 104 is disconnected from battery cells 120a, 120b, which stops the battery charging. The detector 362 may ensure that battery charging is rapidly disabled before potential damage can occur to the battery and/or the device.

Operation

When transistor 350 is turned on, the output signal OC 152 supplied by gate driver 302 will be substantially equal to ground. When transistor 350 is turned off, the output OC 152 enabled by gate driver 302 will be the output 374 of charge pump 303 because the current path to ground through the transistor 350 is not available.

The output 374 from charge pump 303 can provide an output signal OC 152 that is at a level equal to substantially the battery management system 130 supply voltage plus a constant. In some implementations, the constant is equal to two (2) times a regulated voltage input less diode drops and other losses. For example, $$V_{OC} = V_{FET} + 2 V_{REG} - \text{diodes} - \text{losses}$$

where Voc=voltage at output signal OC 152
$V_{FET}$=battery management system 130 supply voltage ($V_{FET}$ 242)
$V_{REG}$=the output voltage from the voltage regulator 208 ($V_{REG}$ 230)
diodes=$V_D$(diode 342)+$V_D$(diode 344)+$V_D$(diode 346)
where $V_D$=voltage drop across a diode
losses=voltage drops from non-ideal effects In the implementation shown in FIG. 3, the constant is generated as follows. The signal 304 is high and is provided to the input of inverter gate 332 and an input of AND gate 322 as discussed above. The clock signal 308 is also provided to the input to AND gate 332 and toggles between high and low at the clock frequency. Initially, when no clock signal is present, the following observations can be made: node 370 on FIG. 3 is at a potential of substantially $V_{FET}$ minus a diode drop (e.g., the drop across diode 342), node 372 is at a potential of substantially $V_{FET}$ minus two diode drops (e.g., the drop across diodes 342 and 344), and node 374 is at a potential of $V_{FET}$ minus three diode drops (e.g., the drop across diodes 342, 344, and 346). When the clock signal 308 transitions high (the high enable signal 304 is assumed to be set), the output of AND gate 332 is high. The high output of AND gate 332 is provided to inverter 334 whose output goes low. The low output of inverter 334 is coupled to inverter 336 whose output is high. The high output of inverter 336 provides a potential ($V_{REG}$) to the input of signal booster 340b (e.g., the lower plate of the capacitive element 340b sees $V_{REG}$). Responsive to the input potential provided by inverter 336, the output of the signal booster 340b (e.g., the opposite plate of the capacitive element 340b) is raised by the $V_{REG}$ potential. In the implementation shown, the capacitive element 340b is charged by an amount equal to the potential provided by the inverter 336, producing a pumped up signal at node 372 (on the output of the charge pump 303). More specifically, when the clock signal goes high the following observations can be made: node 370 on FIG. 3 initially drops (because of the low produced by the output of inverter 334) but then rises back to the level of $V_{FET}$ minus a diode drop (e.g., the drop across diode 342) from the output of the drive signal source 320; node 372 is at a potential of substantially $V_{FET}$ plus $V_{REG}$; and node 374 is a at a potential of $V_{FET}$ plus $V_{REG}$ minus a diode drop (e.g., the drop across diode 344). When the clock signal changes state and falls again, thereby disabling the inverter 336, a similar boosting occurs.

More specifically, when the clock signal 308 is low (signal 304 is again assumed to be high), the output of AND gate 332 is low. The low output of AND gate 332 is provided to inverter 334 whose output goes high. The high output of inverter 334 provides a potential ($V_{REG}$) to the input to signal booster 340a (e.g., the lower plate of the capacitive element 340a sees $V_{REG}$). Responsive to the input potential provided by inverter 334, the output of the signal booster 340a (e.g., the opposite plate of the capacitive element 340a) is raised by the $V_{REG}$ potential. In the implementation shown, the capacitive element is charged by an amount equal to the potential provided by the inverter 334, producing a pumped up signal at node 370 (on the output of the charge pump 303). More specifically, when the clock signal falls the following observations can be made: node 370 on FIG. 3 rises to $V_{FET}$ minus a diode drop (e.g., the drop across diode 342) plus $V_{REG}$ (because of the high output of inverter 334); node 372 is at a potential of substantially $V_{FET}$ plus two times $V_{REG}$ minus a diode drop (e.g., the drop across diode 344); and node 374 is at a potential of $V_{FET}$ plus two times $V_{REG}$ minus two diode drops (e.g., the drop across diodes 344 and 346).

Accordingly, by providing the oscillation of the clock signal from high to low, signal boosters 340a and 340b are alternatively enabled (e.g., charged) so as to pump up the output 374 provided by charge pump 303. The signal level at node 370 can utilize a large amount of clock cycles to reach a steady state level. With each clock oscillation, a certain amount of charge is transferred to a capacitor external to the charge pump 303 connected at OC 152 (not shown) by way of the charger 104. The external capacitor can have a value much larger that the internal capacitor (e.g., signal booster 340a). Therefore, multiple oscillations may be needed to charge the internal capacitor, resulting in the need for multiple clock cycles for the charge pump 303 to reach a steady state condition. At node 370, the signal level, in its steady state condition, is substantially equal to:

$$\text{signal level at node } 370 = V_{FET} + V_{REG} - V_D(\text{diode } 342)$$

where $V_{FET}$=the battery management system supply
$V_{REG}$=the boost from signal booster 340a
$V_D$(diode 342)=the voltage drop across blocking diode 342
At node 372, the signal level is substantially equal to:

$$\text{signal level at node } 372 = V_{FET} + 2 * V_{REG} - V_D(\text{diode } 342) - V_D(\text{diode } 344)$$

where $V_{FET}$=the battery management system supply
2* $V_{REG}$=one boost from signal booster 340a and one boost from signal booster 340b
$V_D$(diode 342)=the voltage drop across blocking diode 342
$V_D$(diode 344)=the voltage drop across blocking diode 344
At the output 374 to the charge pump 303 (node 374), the signal level is substantially equal to:

$$\text{signal level at node } 374 = V_{FET} + 2^*V_{REG} - V_D(\text{diode } 342) - V_D(\text{diode } 344) - V_D(\text{diode } 346)$$

where $V_{FET}$=the battery management system supply
2* $V_{REG}$=one boost from signal booster 340a and one boost from signal booster 340b
$V_D$(diode 342)=the voltage drop across blocking diode 342
$V_D$(diode 344)=the voltage drop across blocking diode 344
$V_D$(diode 346)=the voltage drop across blocking diode 346
The output 374 is provided to gate driver 302 to generate output signal OC 152.

While FIG. 3 shows an exemplary implementation for a gate drive circuit 300, other configurations are possible. For example, more that two signal boosters 340a, 340b can be included in the charge pump 303. In other implementations, a plurality of signal boosters, associated blocking diodes and inverter logic can be used to produce a boosted enable signal that is at a predetermined level (e.g., producing an output signal equal to substantially: $V_{FET}+n^*V_{REG}-n$ diode drops, where n is equal to the number of signal boosters).

In some implementations, other circuitry can be associated with the gate driver 302. For example, control circuitry can be provided to partially enable the gate of the charge transistor, such as might be required to manage recovery from a deep under voltage condition of the batteries. For the purposes of clarity, these other circuit elements have been left out of the drive circuit 300 shown. Further, the details showing the control of signal 304 have been omitted. Details showing the control of signal 306 can include other conditions and circumstances that are not controlled by the detector circuit 362. Supervisory circuitry that forms part of the battery management system 130 can also provide one or both of the signals 304, 306.

FIG. 3 shows a configuration for a drive circuit 300 for a charge transistor associated with a battery pack. A similar drive circuit can be included for a discharge transistor. That is, in one implementation, a separate drive circuit can be provided for the discharge transistor of the battery pack so as to allow the individual and complete control of the respective charge and discharge transistors. Those of ordinary skill in the art will recognize that all of the variations discussed above with respect to the drive circuit 300 associated with the charge transistor 110 are applicable to a drive circuit provided for the discharge transistor 112 including the boosting of the enable signal for completely enabling the discharge transistor.

In another implementation of FIG. 3, the detector 362 can be implemented using PFETS. In this implementation, the rogue charge voltage detector 362 is directly connected to BATT 158 through the clamp 360. This implementation can also include a resistor in series with the connection to BATT 158, which can limit the maximum current if the voltage, BATT 158, remains at a steady state above the threshold voltage level needed to trigger the detector 362. The value of this resistor can be configurable by a user, and, if configurable, may have a minimum value.

Implementations of a Detector

Figure 4:
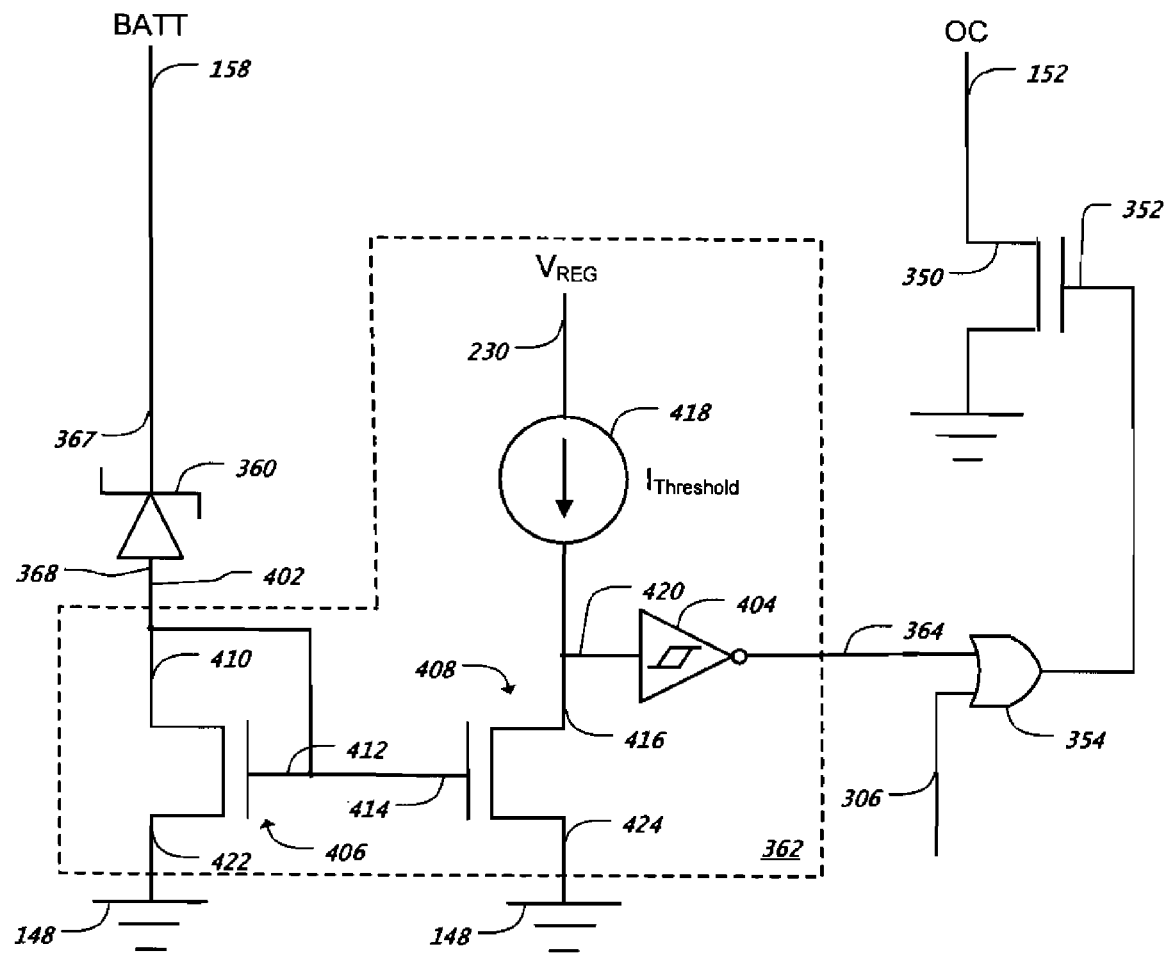
FIG. 4 is a schematic diagram of an exemplary implementation of a rogue charge voltage detector.

FIG. 4 is a schematic diagram of an exemplary implementation of a rogue charge voltage detector 362. The input 402 to the detector 362 is coupled to the anode 368 of clamp 360. The cathode 367 of clamp 360 is coupled to BATT 158. The output signal, OC 152, is a voltage value Voc. The output 364 of the detector 362 and signal 306 are coupled to inputs of OR gate 354. The output of OR gate 354 is coupled to the gate 352 of transistor 350.

The clamp 360, in the exemplary implementation of FIG. 4, is a Zener diode and is also referred to herein as Zener diode 360. In this implementation, the Zener diode 360 is orientated in a reverse-bias mode. In this mode, little or no current will flow through the Zener diode 360 until the voltage value at BATT 158, $V_{BATT}$, applied at the cathode 367, reaches or exceeds the breakdown voltage for the Zener diode (the Zener voltage). When this occurs, Zener diode 360 breaks down, and conducts current. Therefore, the Zener diode 360 can be selected based upon its rated breakdown voltage and the diode's thermal limit so that the Zener diode 360 will conduct when $V_{BATT}$ exceeds the selected voltage.

The detector 362 also includes transistors 406 and 408. The drain 410 and gate 412 of transistor 406 as well as the gate 414 of transistor 408 are coupled to the anode 368 of clamp 360. Source 422 and source 424 of transistors 406 and 408 respectively are coupled to local ground 148.

When the Zener diode 360 does not conduct, transistors 406 and 408 are off. When transistor 408 is off, the input 420 to gate 404 is at a sufficiently high level for its output 364 to be low. The output 364 is coupled to an input to OR gate 354. In some implementations, signal 306 is coupled to another input of the OR gate 354 and is assumed for clarity of explanation to be low. Because the signals 364 and 306 are both low, the output of OR gate 354 is low, which turns transistor 350 off because the output of the OR gate 354 is coupled to the gate 352 of transistor 350. The drain of transistor 350 is coupled to the gate 128 of the charge transistor 110, (not shown in FIG. 4). When the transistor 350 is off, gate 128 is at a sufficiently high level to turn charge transistor 110 on. When the charge transistor 110 is on, the external battery pack positive terminal 150 is connected to the battery cells 120a, 120b, enabling charging of the cells by charger 104.

Alternatively, when the Zener diode 360 breakdowns and conducts, current flows through the Zener diode 360 and into the drain 410 and gate 412 of transistor 406, which is operating in saturation mode, and into the gate 414 of transistor 408. Since transistor 408 has the same gate to source voltage, $V_{GS}$, as transistor 406, it is also operating in saturation mode. Therefore, both transistors 406 and 408 are on.

When transistor 408 is on, the input 420 to gate 404 is at a sufficiently low level for its output 364 to be high. The output 364 is coupled to an input of OR gate 354. Signal 306 is coupled to another input to OR gate 354 and is assumed to be low. The output of OR gate 354 is high and is coupled to the gate 352 of transistor 350, turning transistor 350 on. The drain of the transistor 350 is coupled to the gate 128 of the charge transistor 110. When the transistor 350 is on, gate 128 (as shown in FIG. 1B) is sufficiently low to turn the charge transistor 110 off. When the charge transistor 110 is off, the external battery pack positive terminal 150 is disconnected from the battery cells 120a, 120b, disabling the charging of the cells by charger 104.

In some implementations, logic gate 404 can be a Schmitt trigger inverter. A Schmitt trigger inverter can provide noise immunity and insulation from false triggering due to jitter that may be present. This can result in a more accurate, faster level switch at the gate output. Various types of inverters or other logic circuits may be used depending on the circuit or production constraints, such as the logical layout of the circuit or cost factors.

A regulated voltage (e.g., $V_{REG}$ 230) is coupled to the input of current source 418. A threshold current, $I_{Threshold}$, can be supplied to the input 420 of logic gate 404 that is sufficient to set the output 364 low. In some implementations, the threshold current can be established by placing a resistance between $V_{REG}$ 230 and the input 420 to logic gate 404. The value of the resistance can be chosen such that the current flow through the resistance and the voltage drop across the resistance is sufficient to set the input 420 of logic gate 404 high resulting in a low at the output 364 of logic gate 404.

While the Zener voltage can be a significant factor for the value of the threshold voltage (e.g., the voltage at which the detector 362 will trigger), the threshold current, $I_{Threshold}$, can also be a significant factor. The characteristics (e.g., breakdown voltage) of the Zener diode 360 may not be ideal (e.g., they may differ from the specification for the device). Therefore, a current-voltage relationship can be used for fine tuning the level at which the detector 362 is triggered. Increasing the threshold current, $I_{Threshold}$, can cause a small increase in the voltage value at which the detector 362 will trigger. The current source 418 can have a constant current consumption that is lower than $I_{Threshold}$, which will not cause the detector 362 to trigger. However, this constant current consumption can also increase as $I_{Threshold}$ increases. This can result in an increase in the current consumption of the circuit as compared to a circuit that does not include fine tuning of the threshold current $I_{Threshold}$.

In one example of the circuit's operation, clamp 360 can be a Zener diode rated at a breakdown voltage of 10 Volts. As long as the voltage at the cathode 367 of the clamp 360 remains below 10 volts, the clamp 360 will not conduct (e.g., little or no current will flow through the clamp 360), and transistors 406 and 408 are substantially off. In this configuration, the current source 418 provides a threshold current, $I_{Threshold}$, to input 420 of gate 404, pulling the input 420 up to $V_{REG}$, causing the output of gate 404 to go low.

In some implementations, the output of logic gate 404 is coupled to an input of OR gate 354. Assuming signal 306 is at a low level, the output of OR gate 354 is low and transistor 350 is off. When the transistor 350 is off, gate 128 is sufficiently high to turn charge transistor 110 on. When the charge transistor 110 is on, the external battery pack positive terminal 150 is connected to the battery cells 120a, 120b, enabling the charging of the cells by charger 104.

In other implementations battery cells other than Li-ion (Lithium ion) battery cells can be used. In these implementations, the output of logic gate 404 can be coupled to the gate 352 of the transistor 350 and may be used exclusively to control whether the battery cells can be charged. However, if the voltage at the cathode 367 of the clamp 360 equals or exceeds the Zener voltage of 10 Volts (which may occur when a rogue charger is coupled to the device), the Zener diode 360 will breakdown and conduct current. Zener diode 360 can act as a current source, and transistors 406 and 408 can act as a current mirror. The transistors 406 and 408 can mirror the current, or in some cases the scaled current, to the input 420 of gate 404. When the mirrored current exceeds the threshold current, $I_{Threshold}$, the input 420 of gate 404 is pulled towards ground 148. Transistor 406 provides a ground to the anode of clamp 360. The voltage drop across clamp 360 will be maintained at the rated voltage of the Zener diode, in this example 10 Volts. Transistor 408 provides a low to the input 420 of logic gate 404, resulting in a high at output 364.

In certain implementations, the output 364 is coupled to an input of OR gate 354 and signal 306, which is assumed to be low, is coupled to another input to the OR gate 354. The output of OR gate 354 is coupled to the gate 352 of transistor 350 and is at a high level. Transistor 350 is turned on, which provides a low for the OC 152 that is coupled to the gate 128 of the charge transistor 110. The low signal for the OC 152 turns the charge transistor 110 off effectively stopping the battery from charging by disconnecting the external battery pack positive terminal 150 from the battery cells 120a, 120b. Disconnecting the external battery pack terminals from the battery cells can protect the battery cells 120a, 120b from over-voltage exposure, which may prevent or minimize damage to the battery cells.

As previously described, signal 304 and signal 306 are complementary. In some implementations, when signal 304 is high (and signal 306 is low), the charge pump 303, shown with reference to FIG. 3, is enabled, which enables battery charging.

If the detector 362 detects that BATT 158 carries a rogue charge voltage, the charge pump 303 is disabled and battery charging is disabled. Under these conditions, the signal 304 is low and signal 306 is high, which disables the charge pump 303 and turns charge transistor 110 off.

In some implementations, the cathode 367 of clamp 360 can be coupled to $V_{FET}$ 156. In this case, the voltage level at $V_{FET}$ 156 can be used to determine when the clamp 360 will conduct, and when the detector 362 will enable transistor 350, disabling charging of the battery cells 120a, 120b by charger 104.

In other implementations, the cathode 367 of clamp 360 can be coupled to OC 152. In this case, the voltage level at OC 152, $V_{OC}$, can be used to determine when the clamp 360 will conduct, and when the detector 362 will enable transistor 350, disabling charging of the battery cells 120a, 120b by charger 104.

Implementations of a User Programmable Detector

Figure 5:
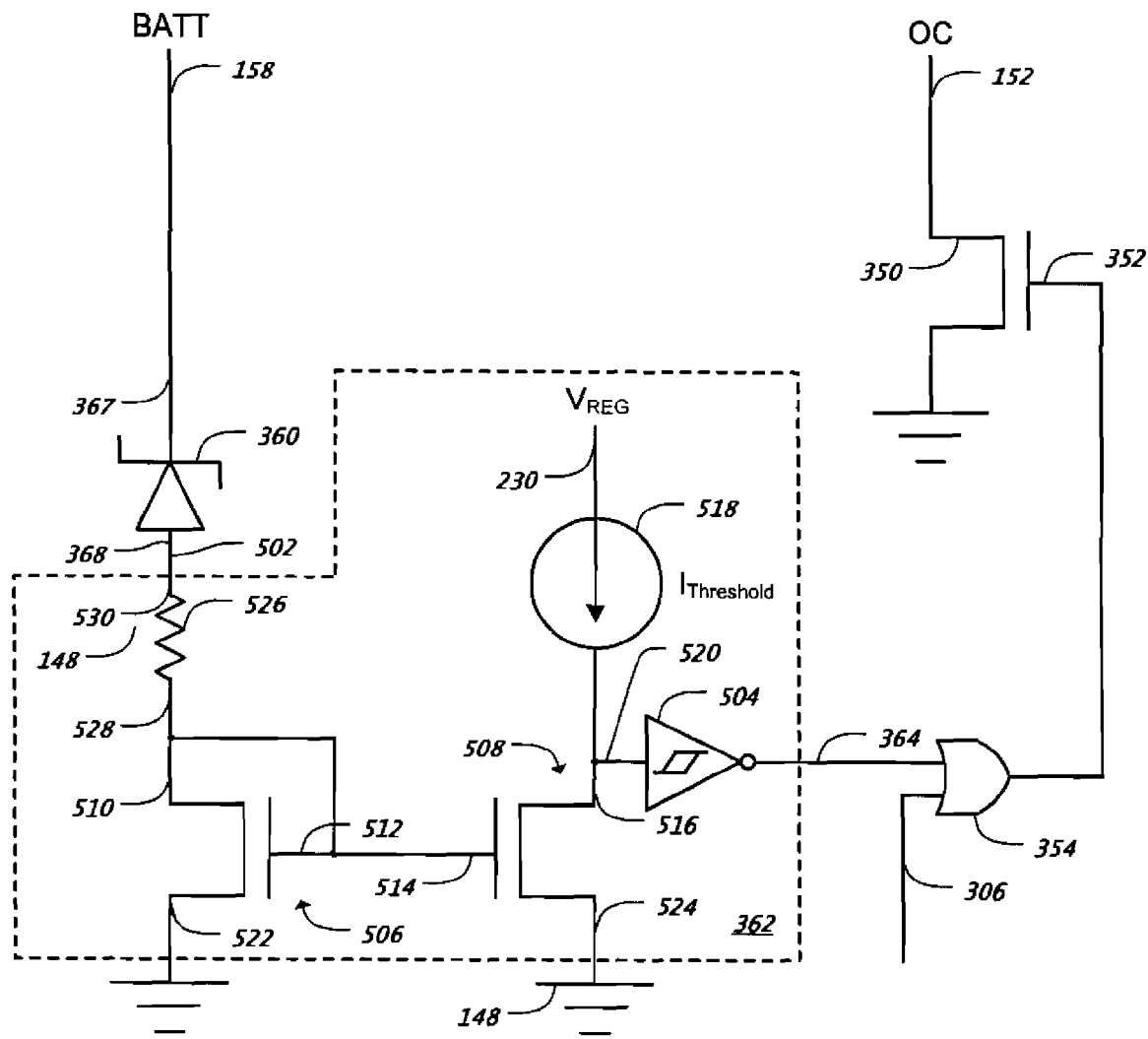
FIG. 5 is a schematic of an exemplary implementation of a rogue charge voltage detector that can be user programmable.

FIG. 5 is a schematic of an exemplary implementation of a rogue charge voltage detector 362 having a detection voltage that can be user programmable. The value of resistance 526 can influence the voltage required before the Zener diode 360 reaches its breakdown voltage. User selection of the resistance 526 can allow the user to specify the desired voltage at which the detector 362 is activated.

As the voltage at the cathode 367 of Zener diode 360 increases, a small current can begin to flow through the Zener diode 360. This current can increase rapidly as the voltage at the cathode 367 approaches the Zener voltage. This current flows through resistor 526, causing a voltage drop to occur across the resistor 526. This voltage drop can cause the voltage that triggers detector 362 to increase. This can occur because the trigger voltage for detector 362 is now the voltage across the resistor 526 plus the Zener voltage. As described with reference to FIG. 4, the detector 362 can be triggered when the current mirrored by transistors 506 and 508 is greater than the current, $I_{Threshold}$, supplied by current source 518. The voltage across the resistor 526 can be determined as follows:

$$\text{Voltage across resistor } 526 = \text{value of resistor } 526 * I_{Threshold}$$

There can be some current flow through resistor 526 before the detector 362 reaches the trigger level (e.g., before Zener diode 360 reaches its breakdown voltage). Resistor 526 can be used to implement small changes in the voltage threshold level of the detector 362.

The use of a software programmable resistor, for example, can allow for the programmability of the resistor value for the small voltage threshold level change desired. The programmable resistor can be implemented on the same integrated circuit (IC) as the detector 362, which may permit different users to use the same IC model but to define different voltage threshold trigger levels for the detector 362.

Input 502 to the detector 362 is coupled to the anode 368 of clamp 360 as well as to terminal 530 of resistance 526. The cathode 367 of clamp 360 is coupled to BATT 158, which can have a voltage value, $V_{BATT}$. The output 364 of the detector 362 is coupled to an input to OR gate 354. Signal 306 is coupled to another input to OR gate 354. The output of OR gate 354 is coupled to the gate 352 of transistor 350.

The exemplary implementation of detector 362 in FIG. 5 operates in a substantially similar manner as the exemplary implementation of the detector 362 of FIG. 4. However, in the implementation of FIG. 5, the addition of the resistance 526 can be used to increase the voltage required to reach the breakdown voltage for the Zener diode 360.

In one example of the operation of the circuit of FIG. 5, clamp 360 can be a Zener diode with a breakdown voltage of 10 Volts. As long as the voltage at the cathode 367 of the clamp 360 remains below 10 volts plus the voltage drop across the resistor 526, only a small current will flow through the clamp 360, and the transistors 506 and 508 remain substantially off. Some current can flow through the clamp 360 and the resistor 526 causing a small voltage drop across the resistor 526, however this drop will not be large enough to affect the state of transistors 506 and 508. Therefore, the input 520 for logic gate 504 is high, and consequently, the output 364 is low. Output 364 is coupled to an input of OR gate 354. Signal 306, assumed to be low, is coupled into another input of OR gate 354. In this state, the output of OR gate 354, which is coupled to the gate 352 of transistor 350, is low. The low input to the gate of transistor 350 keeps it off. Therefore, output signal OC 152 turns on the charge transistor 110, which enables battery charging by connecting the external battery pack positive terminal 150 to the battery cells 120a, 120b.

If the voltage at the cathode 367 of the clamp 360 equals or exceeds the Zener voltage of 10 Volts plus the voltage drop across the resistance 526, the Zener diode will breakdown and conduct current, which causes the detector 362 to output a high signal, which disables battery charging as described above in association with FIG. 4.

Alternative Implementations of a User Programmable Detector

Figure 6:
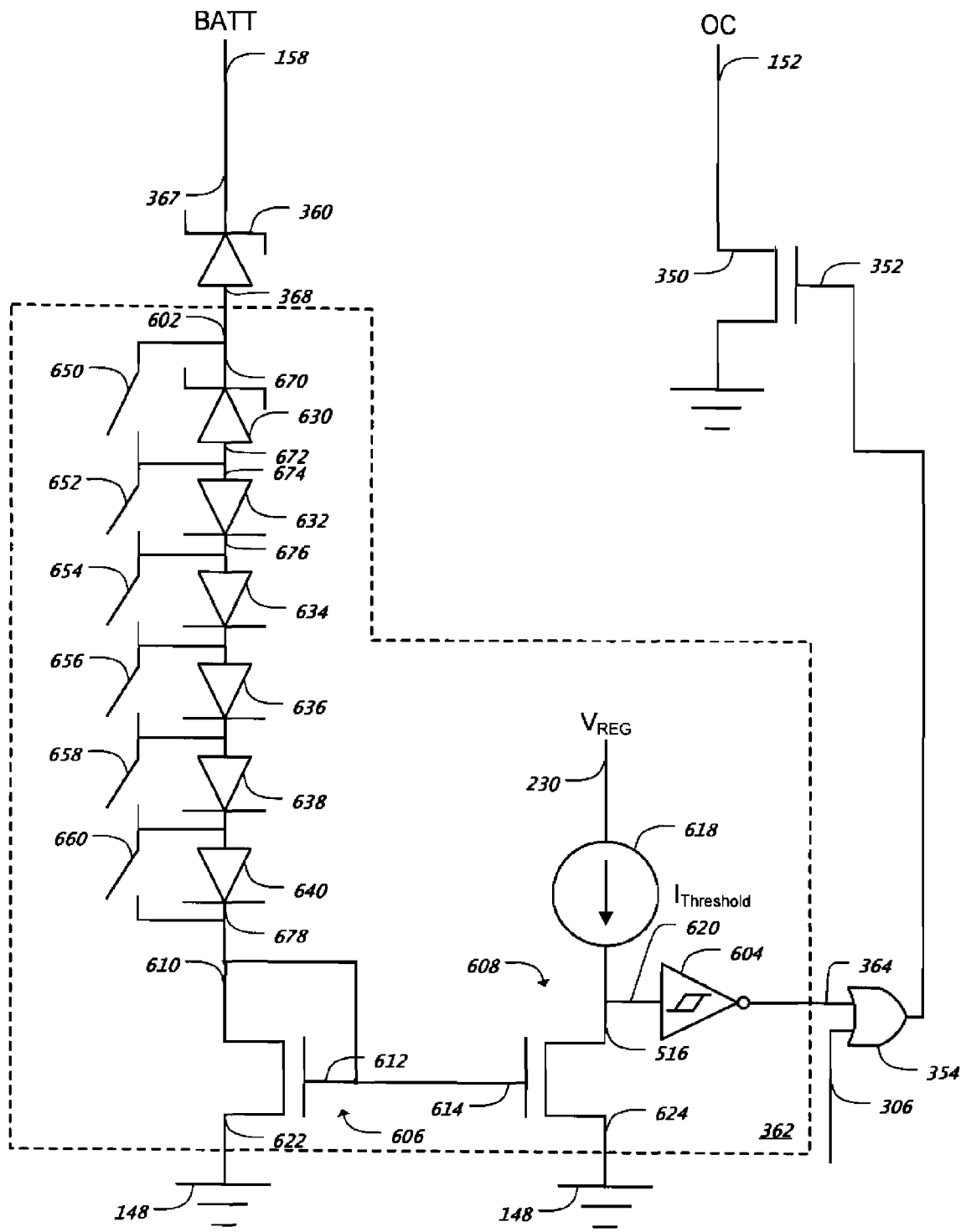
FIG. 6 is a schematic of an alternate exemplary implementation of a rogue charge voltage detector that can be user programmable.

FIG. 6 is a schematic of an exemplary implementation of a rogue charge voltage detector 362 that can be programmed by a user. In this implementation, a user may switch in components, such as Zener diodes, which change the threshold voltage at which the detector 362 outputs a signal to prevent a battery from charging. Here, the input 602 to the detector 362 is coupled to the anode 368 of clamp 360. The cathode 367 of clamp 360 is coupled to BATT 158, which can have a voltage value, $V_{BATT}$. The output 364 of the detector 362 is coupled to an input of OR gate 354 and signal 306 is coupled to another input of OR gate 354. The output of gate 354 is coupled to the gate 352 of transistor 350.

The clamp 360 in the exemplary implementation of FIG. 6 is a Zener diode. The implementation of FIG. 6 operates in a substantially similar manner as the implementation of FIG. 4; however, the exemplary implementation of FIG. 6 differs from the exemplary implementation of FIG. 4 in that the detector 362 also includes Zener diode 630 and five diodes, 630, 632, 634, 636, 638, 640.

In this exemplary implementation, the Zener diode 630 is orientated in the circuit in a reverse-bias mode and the five diodes 632, 634, 636, 638 and 640 are orientated in the circuit in a forward bias mode. The cathode 670 of Zener diode 630 is coupled to the anode 368 of clamp 360. The anode 672 of Zener diode 630 is coupled to the anode 674 of diode 632. The cathode 676 of diode 632 is coupled to the anode 678 of diode 634. Diodes 634, 636, 638, 640 are coupled to each other cathode to anode. The cathode 679 of diode 640 is coupled to the source 610 of transistor 606. The voltage drop across the Zener diode is dependent upon its Zener voltage. The voltage drop across each of the diodes 632, 634, 636, 638, 640 can be substantially 0.7 Volts when current is conducted through the diode. Of course, diodes with various drop voltages can be selected.

Also included in the detector 362 are six switches, 650, 652, 654, 656, 658, 660. Switches 650, 652, 654, 656, 658 and 660 are connected across Zener diode 630 and diodes 632, 634, 636, 638 and 640, respectively. The diodes can be switched in to adjust the threshold voltage that the detector 362 detects.

For example, clamp 360 can be a Zener diode rated at a breakdown voltage of 10 Volts ($V_{BD}$). Zener diode 630 can also be a Zener diode with a breakdown voltage rated at 10 Volts. As described previously, diodes 632, 634, 636, 638 and 640 can each have a voltage drop across them of approximately 0.7 Volts ($V_D$). In the example where switches 650, 652, 654, 656, 658 and 660 are all in the open positions (as shown in FIG. 6), the value of Voc that will cause clamp 360 to activate is partially dependent upon the voltage that will cause Zener diode 630 to conduct. In addition, the voltage drops across the diodes 632, 634, 636, 638 and 640 also affect the voltage that activates the detector 362 because the current path runs through all five diodes when the switches are open. Therefore, to trigger the detector in the implementation of FIG. 6, the value of $V_{BATT}$ must be equal to or greater than the following voltage:

$$V_{BATT} => V_{BD}(\text{clamp 360}) + V_{BD}(\text{diode 630}) + 5*V_D \text{(assuming the voltage drop for each diode is substantially similar)}$$

$V_{BD}$=Zener diode Zener voltage (breakdown voltage)
$V_D$=voltage drop across a diode (e.g., 0.7 Volts)

In the example above, when $V_{BATT}$ is equal to or greater than 23.5 Volts, clamp 360 will conduct causing Zener diode 630 to conduct. Current will flow through diodes 632, 634, 636, 638, 640 and transistors 606 and 608 are turned on.

However, if $V_{BATT}$ remains less than 23.5 Volts, transistors 606 and 608 are turned off. Therefore, the input at gate 604 remains high and the output 364 of detector 362 is low. The output 364 of the detector 362 is coupled to an input to OR gate 354 and signal 306 is coupled to another input to OR gate 354. The output of gate 354 is coupled to the gate 352 of transistor 350. Assuming signal 306 is low, transistor 350 is off and battery charging is enabled.

When $V_{BATT}$ equals or exceeds 23.5 Volts, transistors 606 and 608 are turned on. The transistors 606 and 608 can, therefore, provide a direct signal path to local ground 148. The input at gate 604 is low and the output 364 of detector 362 is high. The output 364 of the detector 362 is coupled to an input of OR gate 354 and signal 306 is coupled to another input to OR gate 354. The output of gate 354 is coupled to the gate 352 of transistor 350. Assuming the signal 306 is low, transistor 350 is turned on in this state, and battery charging is stopped.

In other implementations, a user can control switches 650, 652, 654, 656, 658 and 660 to vary the voltage value of $V_{BATT}$ that causes detector 362 to turn on the transistor 350 and disable charging. For example, switches 650, 652, 654, 656 and 658 may remain opened and switch 660 is closed. This, in effect, shorts out diode 640, removing it from the detector circuit. The value of $V_{BATT}$ that activates the detector 362 can now be calculated as:

$$V_{BATT} => V_{BD}(\text{clamp } 360) + V_{BD}(\text{diode } 630) + 4*V_D$$

$V_{BD}$=Zener diode Zener voltage (breakdown voltage)
$V_D$=voltage drop across a diode (e.g., 0.7 Volts)

In another implementation, switches 652, 654, 656, 658 and 660 are closed and switch 650 remains open. This effectively removes the diodes 632, 634, 636, 638 and 640 from the detector circuit. The value of $V_{BATT}$ that can be met or exceeded for this example can be calculated as:

$$V_{OC} => V_{BD}(\text{clamp } 360) + V_{BD}(\text{diode } 630)$$

$V_{BD}$=Zener diode Zener voltage (breakdown voltage)

In another implementation, switches 650, 652, 654, 656, 658, and 660 can be closed. In this case, the detector circuit can behave as the circuit described with reference to FIG. 4. FIG. 6 shows an implementation including one Zener diode, 630, and five diodes, 632, 634, 636, 638, 640. Alternate implementations can include more than one Zener diode and various other numbers of diodes or other components. The combination of Zener diodes and diodes can be selected by a user to provide the desired threshold voltage for the detector 362 to output a signal to prevent a battery from charging.

Other Alternative Implementations of a User Programmable Detector

Figure 7:
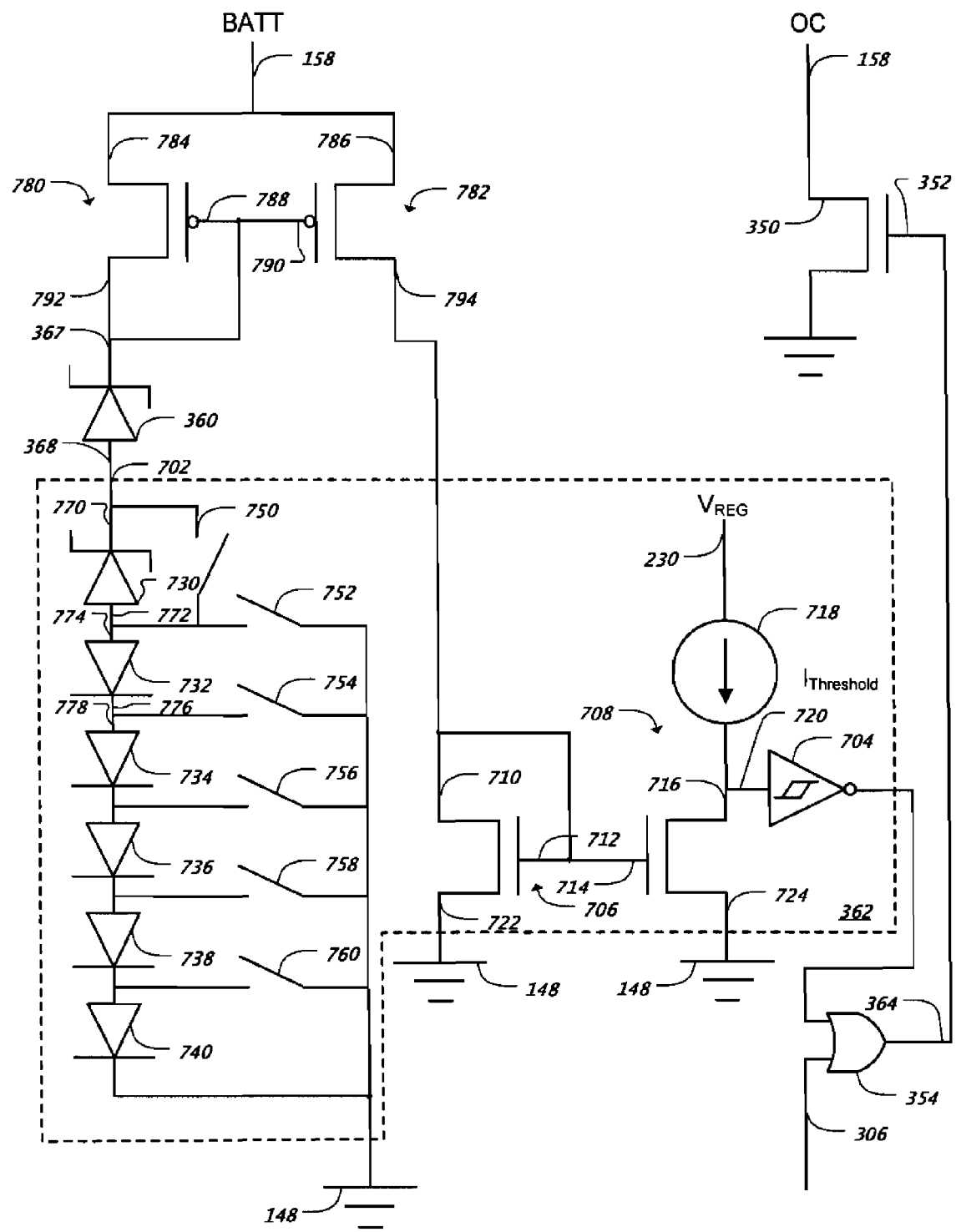
FIG. 7 is a schematic of an alternate exemplary implementation of a rogue charge voltage detector that can be user programmable.

FIG. 7 is a schematic of an alternate exemplary implementation of a rogue charge voltage detector 362 that can be programmed by a user. In this implementation, as was also shown in the implementation of FIG. 6, a user may switch in components, such as diodes, which change the threshold voltage at which the detector 362 outputs a signal to prevent a battery from charging. In the implementation of FIG. 7, however, the gate driver 302 can be modified to include transistors 780 and 782.

In the implementation of FIG. 7, transistors 780 and 782 along with transistors 706 and 708 can be used to replace transistors 606 and 608 that are shown in FIG. 6. Transistors 780 and 782 can form a high side current mirror. This high side current mirror can be mirrored again by the low-side current mirror formed by transistors 706 and 708. The high side current mirror places the current mirror inside the diode chain that includes diodes 360, 730, 732, 734, 736, 738, and 740 at the top of the chain as opposed to the bottom of the chain. Placing the current mirror at the top of the diode chain permits the switches 752, 754, 756, 758, and 760 to have one terminal at ground, which may be easier to implement. It can also ensure that the voltage levels at the top of the diodes 732, 734, 736, 738, and 740 can be kept below 5 Volts, for example, which can allow for the use of standard transistors in the implementation of switches 752, 754, 756, 758, and 760. Standard transistors can be less expensive to implement in silicon than the transistors used for the implementation of switches 650, 652, 654, 656, 658, and 660, as shown in FIG. 6, as these transistors have to operate with higher voltage levels (e.g., greater than 5 Volts).

Sources 784 and 786 of transistors 780 and 782 respectively are coupled to BATT 158. The output signal, OC 152, is a voltage value, Voc. The input 702 to the detector 362 is coupled to the anode 368 of clamp 360. The output 364 of the detector 362 is coupled to the signal 306, which is coupled to the gate of transistor 350. Gates 788 and 790 of transistors 780 and 782 respectively are coupled to each other and to the drain 792 of transistor 780, which is also coupled to the cathode 367 of clamp 360.

The detector also includes transistors 706 and 708. Drain 794 of transistor 782 is coupled to drain 710 and gate 712 of transistor 706 as well as gate 714 of transistor 708. Source 722 and Source 724 of transistors 706 and 708 respectively are coupled to local ground 148.

The clamp 360 in the exemplary implementation of FIG. 7 is a Zener diode. The implementation of FIG. 7 operates in a substantially similar manner as the implementation of FIG. 6. However, the exemplary implementation of FIG. 7, differs from the implementation of FIG. 6 in that it also includes transistors 780 and 782.

Similar to the implementation of FIG. 6, the detector 362 of FIG. 7 also includes Zener diode 730 and five diodes, 730, 732, 734, 736, 738, 740. In this exemplary implementation, the Zener diode 730 is orientated in the circuit in a reverse-bias mode and the five diodes 732, 734, 736, 738 and 740 are orientated in the circuit in a forward bias mode. The cathode 770 of Zener diode 730 is coupled to the anode 368 of clamp 360. The anode 772 of Zener diode 730 is coupled to the anode 774 of diode 732. The cathode 776 of diode 732 is coupled to the anode 778 of diode 734. Diodes 734, 736, 738, 740 are coupled to each other cathode to anode. The cathode 779 of diode 640 is coupled to local ground 148. The voltage drop across the Zener diode is dependent upon its Zener voltage. The voltage drop across each of the diodes 732, 734, 736, 738, 740 is approximately constant at 0.7 Volts when current is conducted through the diode.

Also included in the detector 362 are six switches, 750, 752, 754, 756, 758, 760. Switch 750 is connected across Zener diode 730. Switches 752, 754, 756, 758 and 760, when closed, will connect local ground 148 to the anode of diodes 732, 734, 736, 738 and 740 respectively.

A regulated voltage (e.g., $V_{REG}$ 230) is coupled to current source 718. A threshold current, $I_{Threshold}$, can be supplied to the input 720 of logic gate 704 that is sufficient to set the output of logic gate 704 low. In some implementations, the threshold current, $I_{Threshold}$, can be established by placing a resistance between $V_{REG}$ 230 and the input 720 to logic gate 704. The value of the resistance can be chosen such that the current flow through the resistance and the voltage drop across the resistance are sufficient to set input 720 high which results in output 364 going low.

For example, clamp 360 can be a Zener diode rated at a breakdown voltage of 10 Volts ($V_{BD}$). Zener diode 730 can also be a Zener diode with a breakdown voltage rated at 10 Volts. As described previously, diodes 732, 734, 736, 738 and 740 can each have a voltage drop across them of approximately 0.7 Volts ($V_D$). In the example where switches 750, 752, 754, 756, 758 and 760 are all in the open position (as shown in FIG. 7), the value of $V_{BATT}$ that can cause clamp 360 to activate is also dependent upon the voltage drop across transistor 780 from drain 792 to source 784 ($V_{DS}$), Zener voltage (breakdown voltage) of Zener diode 730, and the voltage drop across diodes 732, 734, 736, 738, 740. In the example of FIG. 7, $V_{DS}$ is equal to the voltage drop from the gate 788 to the source 784 ($V_{GS}$) as the gate 788 is coupled to the drain 792.

Transistors 780 and 782 are disabled until $V_{BATT}$ is greater than or equal to the sum of the voltage drops across the Zener diodes and other diodes as well as any voltage drop across the transistor 784. For example, clamp 360 is activated when:

$$V_{BATT} >= V_{BD}(\text{clamp } 360) + V_{BD}(\text{Zener diode } 730) + (5*V_D) - V_{DS}$$

$V_{BD}$=Zener diode Zener voltage (breakdown voltage)
$V_D$=voltage drop across a diode (e.g., 0.7 Volts)
$V_{DS}$=voltage from drain 792 to source 784 (e.g., −0.8 Volts)

In the example above, when $V_{BATT}$ is equal to or greater than 24.3 Volts Zener diodes 360 and 730 will breakdown and conduct. Current will then flow through Zener diodes 360 and 730 as well as diodes 732, 734, 736, 738, 740. Under these conditions, transistors 706 and 708 are turned on.

However, if $V_{BATT}$ remains less than 24.3 Volts, transistors 706 and 708 are turned off. Therefore, the input 720 of gate 704 is high, and output 364 is low. Additionally, the current source 718 provides a threshold current, $I_{Threshold}$, into input 720 of gate 704, causing the output of gate 404 to go low. The output of logic gate 704 is coupled to an input of OR gate 354. Assuming signal 306 is at a low level, the output of OR gate 354 is low and transistor 350 is off. When the transistor 350 is off, gate 128 is sufficiently high to turn charge transistor 110 on. When the charge transistor 110 is on, the external battery pack positive terminal 150 is connected to the battery cells 120a, 120b, enabling the charging of the cells by charger 104.

When $V_{BATT}$ equals or exceeds 24.3 Volts, transistors 706 and 708 are turned on. When on, the transistors 706 and 708 can provide a direct signal path to local ground 148. Transistor 708 provides a low to the input 720 of logic gate 704, resulting in a high at output 364. The output 364 is coupled to an input of OR gate 354 and signal 306, which is assumed to be low, is coupled to another input to the OR gate 354. The output of OR gate 354 is coupled to the gate 352 of transistor 350 and is high. Transistor 350 is turned on and provides a low to the gate 128 of the charge transistor 110, which turns the transistor 110 off. This will stop the battery from charging by disconnecting the external battery pack positive terminal 150 from the battery cells 120a, 120b. In other implementations, a user can control switches 750, 752, 754, 756, 758 and 760 to vary the voltage value of $V_{BATT}$ that activates the detector 362, similar to the implementations described in association with FIG. 6.

Exemplary Method for Detecting Rogue Charge Voltage

Figure 8:
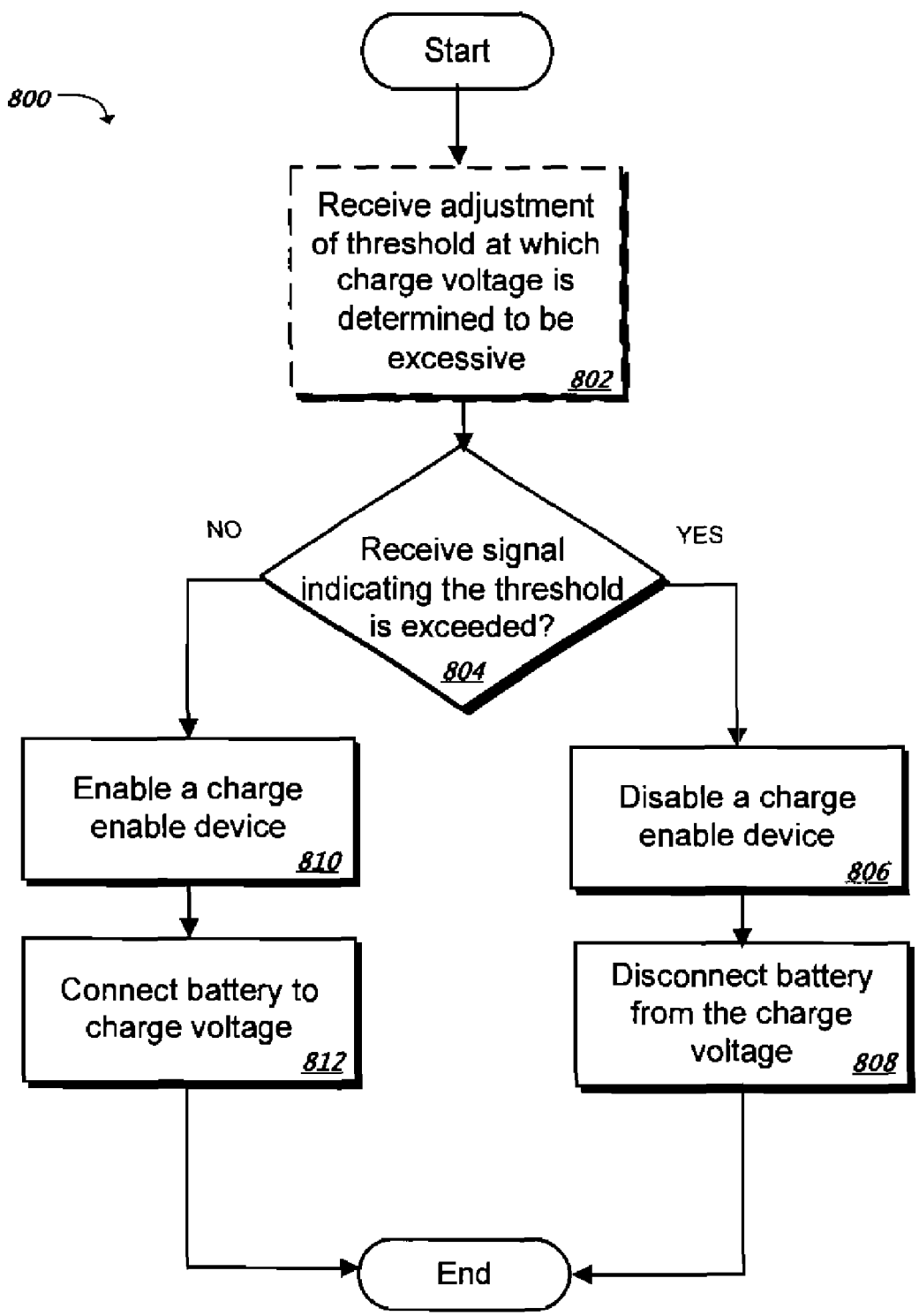
FIG. 8 is a flow chart of an exemplary method for detecting a rogue charge voltage.

FIG. 8 is a flow chart of an exemplary method 800 for detecting a rogue charge voltage. In certain implementations, the method 800 can be performed by circuitry illustrated in FIG. 1B and FIG. 3.

In optional step 802, an adjustment can be received, which changes the threshold at which a charge voltage is determined to be excessive. For example, a user can manipulate switches, such as switches 650 through 660, to adjust the voltage at which the transistors 606, 608 are turned on. In certain implementations, the users can use the switches to effectively remove circuit components from a current path connecting BATT 158 to transistors, such as the transistors 606, 608. Removal of the circuit components can decrease the voltage required to trigger the detector 362.

In step 804, it can be determined whether a maximum threshold for a charging voltage is exceeded. For example, the Zener diode 360 can break down and conduct current if BATT 158 exceeds the threshold voltage. As described in association with step 802, the threshold voltage can be adjusted by the user. Alternatively, the threshold voltage can be fixed at manufacture time by using components that are not subject to manipulation by users. In some implementations, the threshold voltage is set by the breakdown voltages of Zener diodes, resistance values, or diode voltage drops of components placed in the current path between BATT 158 and the transistors 606, 608.

If the threshold is exceeded, a charge enable device can be disabled, as indicated by step 806. For example, the rogue voltage detector 362 can output a signal that disables the charge transistor 110. In step 808, a battery can be disconnected from the charge voltage. For example, disabling the charge transistor 110 can prevent the charge voltage from charging the battery cells 120a, 120b by preventing current flow from a charger to the battery cells 120a, 120b through the charge transistor 110.

If a charging voltage does not exceed the threshold, a charge enable device can be enabled, as indicated by the step 810. In certain implementations, the rogue voltage detector 362 can output a signal, which does not disable the charge transistor 110, permitting a high voltage output produced by the charge pump 303 to be coupled to the gate 128 of charge transistor 110.

In step 812, a battery is connected to the charge voltage. For example, the enabling of the charge transistor 110 can permit the charge voltage to pass through the charge transistor 110 to the battery cells 120a, 120b.

After either steps 808 or 812, the method 800 can end.

Exemplary Circuit Operation for Detecting Rogue Charge Voltage

Figure 9:
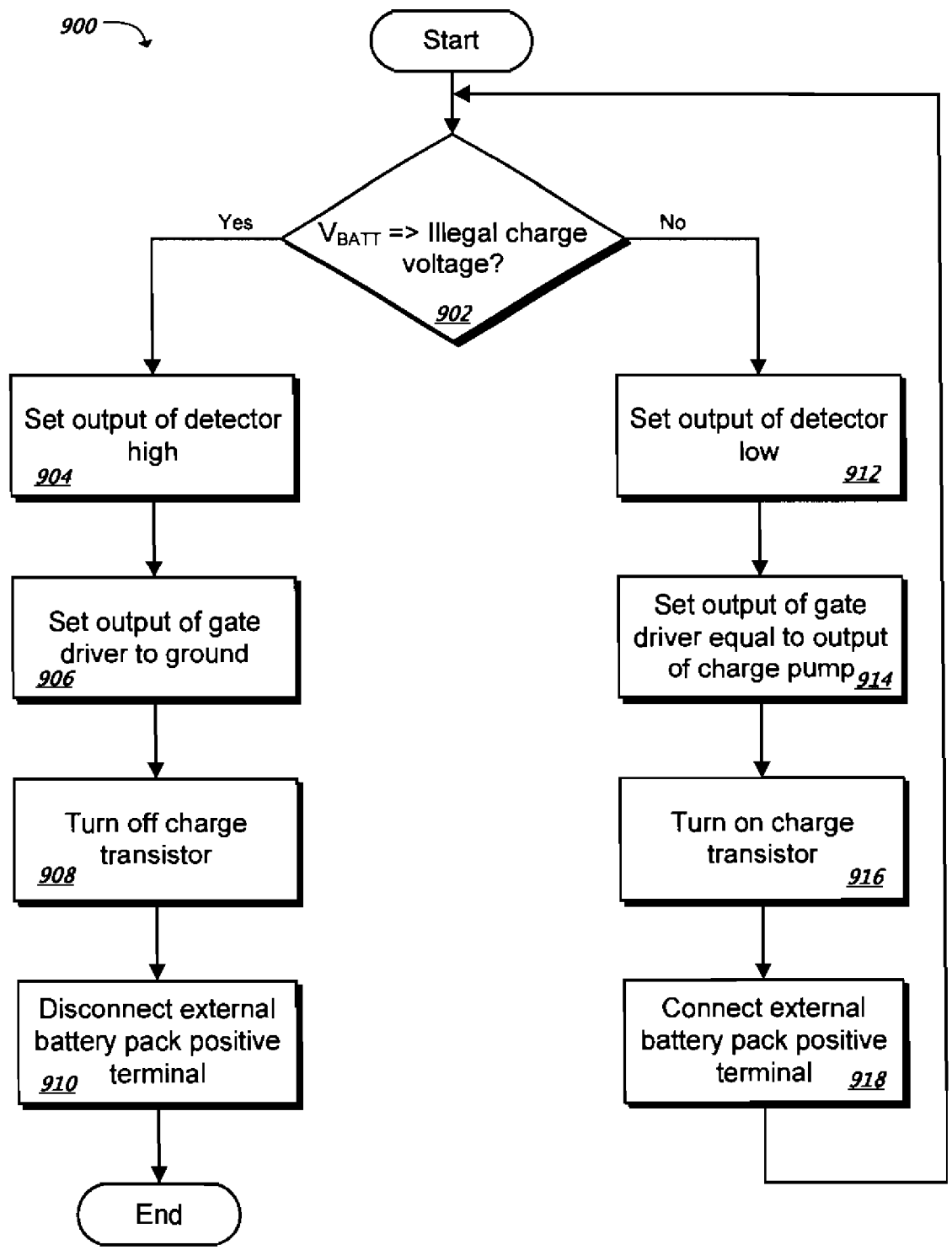
FIG. 9 is a flow chart of an exemplary circuit operation for detecting a rogue charge voltage.

FIG. 9 is a flow chart of an exemplary circuit operation 900 for detecting a rogue charge voltage. An example implementation of the circuit operation is described with reference to FIGS. 4-7. The circuit operation 900 starts by determining if the value of $V_{BATT}$ is greater than or equal to a rogue charge voltage, step 902. The rogue charge voltage that activates the rogue voltage detector 362 can be set by the circuitry within the detector as discussed in association with FIGS. 4-7.

If $V_{BATT}$ is determined in step 902 to be less than the rogue charge voltage threshold value in the detector 362, the output 364 of the detector 362 is set low in step 912. As described with reference to FIGS. 4-7, a low output from the detector turns transistor 350 off, which in turn enables the output of gate driver 302 to be substantially equal to the output 374 of charge pump 303, as indicated by step 914. The output 374 of the charge pump 303 can be determined by the input signal 304, as was described with reference to FIG. 3.

When the output of the gate driver 302 is substantially equal to the output of the charge pump 303, charge transistor 110 is turned on by the output of the gate driver 302, as indicated by step 916.

When charge transistor 110 is on, the external battery pack positive terminal 150 is connected, as indicated in step 918, to the battery cells 120a, 120b. This, in turn, permits charging of the battery cells 120a, 120b by the charger 104. The circuit operation 900 can then proceed to step 902, where the $V_{batt}$ continues to be monitored.

If, in step 902, it is determined that $V_{BATT}$ is equal to or greater than the rogue charge voltage threshold value in the detector 362, the output 364 of the detector 362 is set high, as indicated by step 904. As described with reference to FIGS. 4-7, when the detector's output is set high, transistor 350 is turned on, which sets the output of gate driver 302 substantially equal to ground, as indicated by step 906.

When the output of the gate driver 302 is set substantially to ground, the charge transistor 110 is off, as indicated by step 908. When charge transistor 110 is off, the external battery pack positive terminal 150 is disconnected from the battery cells 120a, 120b, as indicated in step 910. Disconnection of the battery cells, in turn, prevents the battery cells 120*a*, 120*b* from being charged by the charger 104. After step 910, the circuit operation 900 can end.

A number of embodiments of the invention have been described. Nevertheless, it will be understood that various modifications may be made without departing from the spirit and scope of the invention. For example, the resistance 526 illustrated in FIG. 5, can be a variable resistance. Instead of setting the voltage at which the detector is activated at design time by the selection of a single value resistance, the user may vary the resistance of the resistance after design, and thus vary the voltage threshold at which the detector activates.

Additionally, in certain implantations, the logic states used to activate circuit components can be varied by using different circuit components. For example, the detector may output a low to enable the transistor 350 to pass current from the source to the drain if the transistor 350 is configured to turn on when the gate receives a grounded, or low, voltage.

Accordingly, other embodiments are within the scope of the following claims.

What is claimed is:

1. An apparatus comprising:
    a battery system comprising at least one cell and a charge enable device to couple the at least one cell to a charging voltage; and
    an excessive voltage detector to output a signal to control the charge enable device, wherein the signal prevents charging of the at least one cell if an excessive charging voltage is detected based on an activation of a clamping component; and
    a first current mirror that is activated by the activation of the clamping component, wherein the activated first current mirror changes a state of a logic element used to output the signal to control the charge enable device.

2. The apparatus of claim 1, further comprising a charge pump to output a second signal to enable the charge enable device in the absence of the output signal from the excessive voltage detector.

3. The apparatus of claim 2, wherein the charge pump comprises boost circuitry to drive the second signal at a potential greater than a potential of the at least one cell.

4. The apparatus of claim 1, further comprising a switch to connect a control of the charge enable device to a voltage sufficient to disable the charge enable device when the switch receives the output signal from the excessive voltage detector.

5. The apparatus of claim 1, wherein the charge enable device comprises a transistor.

6. The apparatus of claim 1, wherein the clamping component comprises one or more diodes.

7. The apparatus of claim 6, wherein at least one of the one or more diodes is a Zener diode.

8. The apparatus of claim 1, further comprising the clamping component, wherein the clamping component comprises one or more devices that are used to detect the excessive charging voltage.

9. The apparatus of claim 8, wherein the one or more devices affect a threshold voltage that activates the clamping component.

10. The apparatus of claim 8, further comprising one or more switches to switch the one or more devices out of series with other devices of the clamping component.

11. The apparatus of claim 8, further comprising one or more switches that when closed provide alternative current paths through the one or more switches that are different from current paths provided through the one or more devices.

12. The apparatus of claim 8, wherein the one or more devices comprise one or more resistive components.

13. The apparatus of claim 1, further comprising a second current mirror that passes current to the first current mirror when the clamping component is activated.

14. A method comprising:
    determining, based on an activation of a first clamping component, whether excessive voltage is coupled to a battery system comprising at least one cell and a charge enable device used to control charging of the at least one cell; and
    outputting a signal to the charge enable device to disable charging of the at least one cell if excessive voltage is present;
    wherein determining whether excessive voltage is coupled to the battery system comprises activating a first current mirror circuit.

15. The method of claim 14, wherein determining whether an excessive voltage is coupled to the battery system is further based on a voltage drop of one or more devices included in the first clamping component.

16. The method of claim 15, wherein the one or more devices comprise diodes.

17. The method of claim 16, wherein at least one of the one or more devices is a Zener diode.

18. The method of claim 17, wherein a voltage is determined to be excessive based on whether the voltage exceeds a breakdown voltage for the Zener diode.

19. The method of claim 15, further comprising adjusting a threshold at which a voltage is determined to be excessive by switching one or more of the devices out of series with other devices included in the first clamping component.

20. The method of claim 15, further comprising adjusting a threshold at which a voltage is determined to be excessive by manipulating switches to provide current paths through the switches that are different from current paths provided through the one or more devices.

21. The method of claim 20, further comprising receiving user input specifying which switches to manipulate.

22. The method of claim 14, further comprising disabling the charge enable device using the output signal.

23. The method of claim 22, wherein using the output signal comprises driving a voltage provided to the charge enable device to a sufficient level so that current flow through the charge enable device is substantially restricted.

24. The method of claim 15, further comprising outputting a second signal to enable charging of the at least one cell if excessive voltage is not present.

25. The method of claim 24, wherein the second signal enables a drive signal to pass to the charge enable signal.

26. The method of claim 25, wherein the drive signal drives a control of the charge enable device at a potential greater than a potential of the one or more cells.

27. The method of claim 14, wherein the determination further comprises using the first current mirror to change a state of a logic element used to output the signal to the charge enable device.

28. The method of claim 27, wherein the determination further comprises using the first current mirror to activate a second current mirror used to change a state of a logic element used to output the signal to the charge enable transistor.

29. The method of claim 14, wherein outputting the signal to the charge enable device comprises enabling a switching transistor that couples a control of the charge enable device to a voltage sufficient to turn the charge enable transistor off.

30. The method of claim 14, wherein determining whether excessive voltage is coupled to a battery system is additionally based on a resistive component coupled to the first clamping component.

31. The method of claim 14, wherein the charge enable device comprises a transistor.

* * * * *

UNITED STATES PATENT AND TRADEMARK OFFICE
CERTIFICATE OF CORRECTION

| | | |
|---|---|---|
| PATENT NO. | : 7,990,108 B2 | Page 1 of 1 |
| APPLICATION NO. | : 11/748278 | |
| DATED | : August 2, 2011 | |
| INVENTOR(S) | : Arne Aas et al. | |

It is certified that error appears in the above-identified patent and that said Letters Patent is hereby corrected as shown below:

Title Page, (75) Inventors: Change "Gunnar Gastoe" to -- Gunnar Gangstoe --

Signed and Sealed this
Fourth Day of October, 2011

David J. Kappos
*Director of the United States Patent and Trademark Office*